(12) United States Patent
Saino

(10) Patent No.: US 9,223,763 B2
(45) Date of Patent: Dec. 29, 2015

(54) DOCUMENT GENERATION APPARATUS, METHOD, AND STORAGE MEDIUM

(71) Applicant: CANON KABUSHIKI KAISHA, Tokyo (JP)

(72) Inventor: Yoko Saino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 13/747,867

(22) Filed: Jan. 23, 2013

(65) Prior Publication Data

US 2013/0132829 A1 May 23, 2013

Related U.S. Application Data

(63) Continuation of application No. 12/111,323, filed on Apr. 29, 2008, now Pat. No. 8,386,923.

(30) Foreign Application Priority Data

May 8, 2007 (JP) ................................ 2007-123786

(51) Int. Cl.
| | |
|---|---|
| G06F 17/00 | (2006.01) |
| G06F 17/21 | (2006.01) |
| G06F 17/24 | (2006.01) |
| G06F 17/30 | (2006.01) |
| H04N 1/00 | (2006.01) |
| H04N 1/21 | (2006.01) |
| H04N 1/32 | (2006.01) |

(52) U.S. Cl.
CPC ............ *G06F 17/212* (2013.01); *G06F 17/211* (2013.01); *G06F 17/248* (2013.01); *G06F 17/30554* (2013.01); *H04N 1/00334* (2013.01); *H04N 1/00342* (2013.01); *H04N 1/2166* (2013.01); *H04N 1/32133* (2013.01); *H04N 1/32138* (2013.01); *H04N 2201/0094* (2013.01); *H04N 2201/3205* (2013.01); *H04N 2201/3207* (2013.01); *H04N 2201/3209* (2013.01); *H04N 2201/3276* (2013.01)

(58) Field of Classification Search
CPC .................................................... G06F 17/211
See application file for complete search history.

(56) References Cited

U.S. PATENT DOCUMENTS

| | | | |
|---|---|---|---|
| 5,787,414 | A | 7/1998 | Miike et al. |
| 6,339,650 | B1 | 1/2002 | Yoshida et al. |
| 7,383,496 | B2 | 6/2008 | Fukuda |
| 7,401,071 | B2 | 7/2008 | Hattori et al. |
| 7,461,789 | B2 | 12/2008 | Katsurabayashi et al. |
| 7,657,887 | B2 | 2/2010 | Kothandaraman et al. |
| 7,716,255 | B2 | 5/2010 | Stuhec |

(Continued)

FOREIGN PATENT DOCUMENTS

JP 5-150920 6/1993

*Primary Examiner* — Laurie Ries
(74) *Attorney, Agent, or Firm* — Fitzpatrick, Cella, Harper & Scinto

(57) ABSTRACT

A document generation apparatus comprises: a first acquisition unit adapted to acquire, based on identification information appended to a first document, layout data and data acquisition information required to acquire data to be laid out in accordance with the layout data; a second acquisition unit adapted to acquire data based on the data acquisition information acquired by the first acquisition unit; and a generation unit adapted to generate a second document on which the data acquired by the second acquisition unit are laid out in accordance with the layout data acquired by the first acquisition unit.

6 Claims, 20 Drawing Sheets

(56) References Cited

U.S. PATENT DOCUMENTS

| | | |
|---|---|---|
| 7,836,012 B1 | 11/2010 | Nevill-Manning et al. |
| 7,962,181 B2 | 6/2011 | Gielow et al. |
| 2001/0018697 A1 | 8/2001 | Kunitake et al. |
| 2002/0184359 A1 | 12/2002 | Kaneko et al. |
| 2003/0126136 A1 | 7/2003 | Omoigui |
| 2003/0221170 A1* | 11/2003 | Yagi ............................... 715/517 |
| 2004/0098362 A1 | 5/2004 | Gargi |
| 2004/0148274 A1 | 7/2004 | Warnock et al. |
| 2004/0181671 A1* | 9/2004 | Brundage et al. ............. 713/176 |
| 2004/0223648 A1 | 11/2004 | Hoene et al. |
| 2004/0261016 A1* | 12/2004 | Glass et al. .................. 715/512 |
| 2005/0050099 A1 | 3/2005 | Bleistein et al. |
| 2005/0060643 A1 | 3/2005 | Glass et al. |
| 2005/0071755 A1 | 3/2005 | Harrington et al. |
| 2005/0160355 A1 | 7/2005 | Cragun et al. |
| 2005/0257130 A1 | 11/2005 | Ito |
| 2006/0041579 A1 | 2/2006 | Miyashita et al. |
| 2006/0190811 A1 | 8/2006 | Ohno |
| 2006/0215226 A1 | 9/2006 | Hoshino |
| 2006/0242180 A1* | 10/2006 | Graf et al. ...................... 707/101 |
| 2006/0253478 A1 | 11/2006 | Graham et al. |
| 2006/0271903 A1 | 11/2006 | Hamazaki |
| 2007/0055929 A1 | 3/2007 | Giannetti et al. |
| 2007/0074109 A1 | 3/2007 | Nagahara et al. |
| 2007/0076258 A1 | 4/2007 | Yoda |
| 2007/0094191 A1* | 4/2007 | Wu et al. ......................... 706/46 |
| 2007/0126793 A1 | 6/2007 | Yamakado et al. |
| 2007/0180377 A1 | 8/2007 | Gittelman et al. |
| 2007/0203707 A1 | 8/2007 | Carus et al. |
| 2007/0245226 A1 | 10/2007 | Tsutsumi |
| 2007/0245228 A9 | 10/2007 | Lavoie et al. |
| 2007/0250485 A1 | 10/2007 | Ushiku |
| 2008/0022107 A1 | 1/2008 | Pickles et al. |
| 2008/0141117 A1 | 6/2008 | King et al. |
| 2008/0201636 A1 | 8/2008 | Fujiwara |
| 2009/0119578 A1 | 5/2009 | Relyea et al. |

* cited by examiner

F I G. 14

2901

| NEW /<br>UPDATE | Name | Address | Telephone |
|---|---|---|---|
| 0 | Imada | Tokyo | 3210 |
| | Koyama | Tokyo | 2345 |
| | Saito | Tokyo | 6789 |
| 0 | Watanabe | Tokyo | 4567 |

CUSTOMER TABLE

DELETED DATA :

F I G. 15

| IDENTIFICATION INFORMATION | TEMPLATE SET STORAGE LOCATION | CONTENT DATA INFORMATION |
|---|---|---|
| 1234567890 | file:///C:/doc/template1.zip | file:///C:/doc/Contents1.xml |
| 2345678901 | http://host1/doc/template2.zip | http://host1/doc/Contents2.xml |
| 3456789012 | http://host2/doc/template3.zip | RetrieveDateTime=2005-10-06T21:05:20Z |

| MONTHLY SALES TABLE | |
|---|---|
| DIVISION | SALES (TEN-THOUSANDS YEN) |
| A | 1500 |
| B | 1850 |
| C | 1350 |
| D | 1400 |

2502

| MONTHLY SALES TABLE | | |
|---|---|---|
| DIVISION | SALES (TEN-THOUSANDS YEN) | DIFFERENCE (TEN-THOUSANDS YEN) |
| A | 1500 | +75 |
| B | 1850 | −100 |
| C | 1350 | +50 |
| D | 1400 | +250 |

FIG. 18

| dataListSales | 2701 |
|---|---|
| Id | Id101 |
| division | A |
| sales | 1500 |

| Id | Id102 |
|---|---|
| division | B |
| sales | 1850 |

| Id | Id103 |
|---|---|
| division | C |
| sales | 1350 |

| Id | Id104 |
|---|---|
| division | D |
| sales | 1400 |

| dataListSales | 2702 |
|---|---|
| Id | Id101 |
| division | A |
| sales | 1575 |

| Id | Id102 |
|---|---|
| division | B |
| sales | 1750 |

| Id | Id103 |
|---|---|
| division | C |
| sales | 1400 |

| Id | Id104 |
|---|---|
| division | D |
| sales | 1650 |

```
<table>
 <tr>
  <td>
    MONTHLY SALES TABLE
  </td>
 </tr>
</table>
<table>
 <tr>
  <td>
    DIVISION
  </td>
  <td>
   SALES (TEN-THOUSANDS YEN)
  </td>
  <td>
   DIFFERENCE (TEN-THOUSANDS YEN)
  </td>
 </tr>
 <for listName="dataListSales"/>
 <tr>
  <td>
    <data name="dataListSales.division"/>
  </td>
  <td>
   <data name="dataListSales.sales/>
  </td>
  <td>
    <if condition="differ" data="dataListSales.sales">
     <subtract data="dataListSales.sales"/>
    </if>
  </td>
 </tr>
 </for>
</table>
```

FIG. 20

```
<table>
 <tr>
  <td>
    MONTHLY SALES TABLE
  </td>
 </tr>
</table>
<table>
 <tr>
  <td>
    DIVISION
  </td>
  <td>
    SALES (TEN-THOUSANDS YEN)
  </td>
  <td>
    DIFFERENCE (TEN-THOUSANDS YEN)
  </td>
 </tr>
 <tr>
  <td>A</td>
  <td>1500</td>
  <td>+75</td>
 </tr>
 <tr>
  <td>B</td>
  <td>1850</td>
  <td>−100</td>
 </tr>
 <tr>
  <td>C</td>
  <td>1350</td>
  <td>+50</td>
 </tr>
 <tr>
  <td>D</td>
  <td>1400</td>
  <td>+250</td>
 </tr>
</table>
```

DOCUMENT GENERATION APPARATUS, METHOD, AND STORAGE MEDIUM

This is a continuation of U.S. patent application Ser. No. 12/111,323, filed Apr. 29, 2008.

BACKGROUND OF THE INVENTION

1. Field of the Invention

The present invention relates to a document generation apparatus, method, and storage medium for generating a document on which retrieved data are laid out.

2. Description of the Related Art

Conventionally, as a technique for executing form generation processing, a technique for generating print data by merging data registered in a database with form template data that represents the design of a form is known (for example, see Japanese Patent Laid-Open No. 05-150920). This technique is used not only for forms such as account books, slips, and the like, but also for generation of various documents.

Data on a database used upon generating a document by merging with layout information indicating the design of a document are often not steady. Normally, the database allows to register, update, and delete data, and data may change constantly.

That is, the contents of data retrieved based on condition settings associated with data retrieval change depending on the generation timings of documents, and a document to be generated finally may have a result different from the previously output document.

For example, upon generation of a document that records a sales result, by setting a condition required to retrieve data of that day, which are always output from the database, a document that records the output sales of that day can be obtained. In this way, there are needs for acquiring documents that always record latest data.

On the other hand, as described above, the user, who browses a certain document, often wants to acquire a document configured by different data on a database in association with the document that he or she is browsing. Different data on the database include latest data at that time and the like.

In such case, conventionally, the user needs to search for template data used to generate the document that he or she is browsing, and data that describes the data retrieval source, retrieval condition, and retrieved data contents, and to generate a new document by designating these data. It takes much time to search various template data and various data that describe the data retrieval sources, retrieval conditions, and retrieved data contents for those which are associated with the data that the user is browsing, resulting in poor efficiency.

SUMMARY OF THE INVENTION

It is, therefore, an object of the present invention to allow the user to easily generate a desired document.

According to one aspect of the present invention, a document generation apparatus comprises:

a first acquisition unit adapted to acquire, based on identification information appended to a first document, layout data and data acquisition information required to acquire data to be laid out in accordance with the layout data;

a second acquisition unit adapted to acquire data based on the data acquisition information acquired by the first acquisition unit; and a generation unit adapted to generate a second document on which the data acquired by the second acquisition unit are laid out in accordance with the layout data acquired by the first acquisition unit.

According to another aspect of the present invention, a document generation method comprises:

a first acquisition step of acquiring, based on identification information appended to a first document, layout data and data acquisition information required to acquire data to be laid out in accordance with the layout data;

a second acquisition step of acquiring data based on the data acquisition information acquired in the first acquisition step; and a generation step of generating a second document on which the data acquired in the second acquisition step are laid out in accordance with the layout data acquired in the first acquisition step.

According to still another aspect of the present invention, a storage medium storing a program for generating a document, the computer program comprises:

a first acquisition step of acquiring, based on identification information appended to a first document, layout data and data acquisition information required to acquire data to be laid out in accordance with the layout data;

a second acquisition step of acquiring data based on the data acquisition information acquired in the first acquisition step; and a generation step of generating a second document on which the data acquired in the second acquisition step are laid out in accordance with the layout data acquired in the first acquisition step.

Further features of the present invention will become apparent from the following description of exemplary embodiments with reference to the attached drawings.

BRIEF DESCRIPTION OF THE DRAWINGS

FIG. 14 is a view showing an example of a document to be generated;

FIG. 15 is a view showing an identification information table which associates identification information with information of content data used in generation of an original document;

FIG. 17 is a view showing an example of an original document and a document to be generated;

FIG. 18 is a view showing an example of data on a database;

FIG. 19 is a view showing an example of a template; and

FIG. 20 is a view showing an example of a merged document.

DETAILED DESCRIPTION OF THE EMBODIMENTS

Preferred embodiments to which the present invention is applied will be described in detail hereinafter with reference to the accompanying drawings.

The first embodiment of the present invention will be described first. In this embodiment, a multi-functional printer having a copy function, scan function, print function, and the like (to be referred to as a multi-functional peripheral (MFP) hereinafter) will be exemplified as a device that executes document generation. However, apparatuses that can practice the present invention are not limited to an MFP.

In this embodiment, identification information is embedded in a document, and the MFP executes processing for reading the identification information from the document. As another embodiment, an independent information processing apparatus which is different from the MFP may read identification information, and may transmit the read identification information to the MFP. The information processing apparatus that reads identification information includes, for example, a scanner, barcode scanner, two-dimensional barcode reader, RFID (Radio Frequency Identification) tag reader, and the like.

Figure 1:
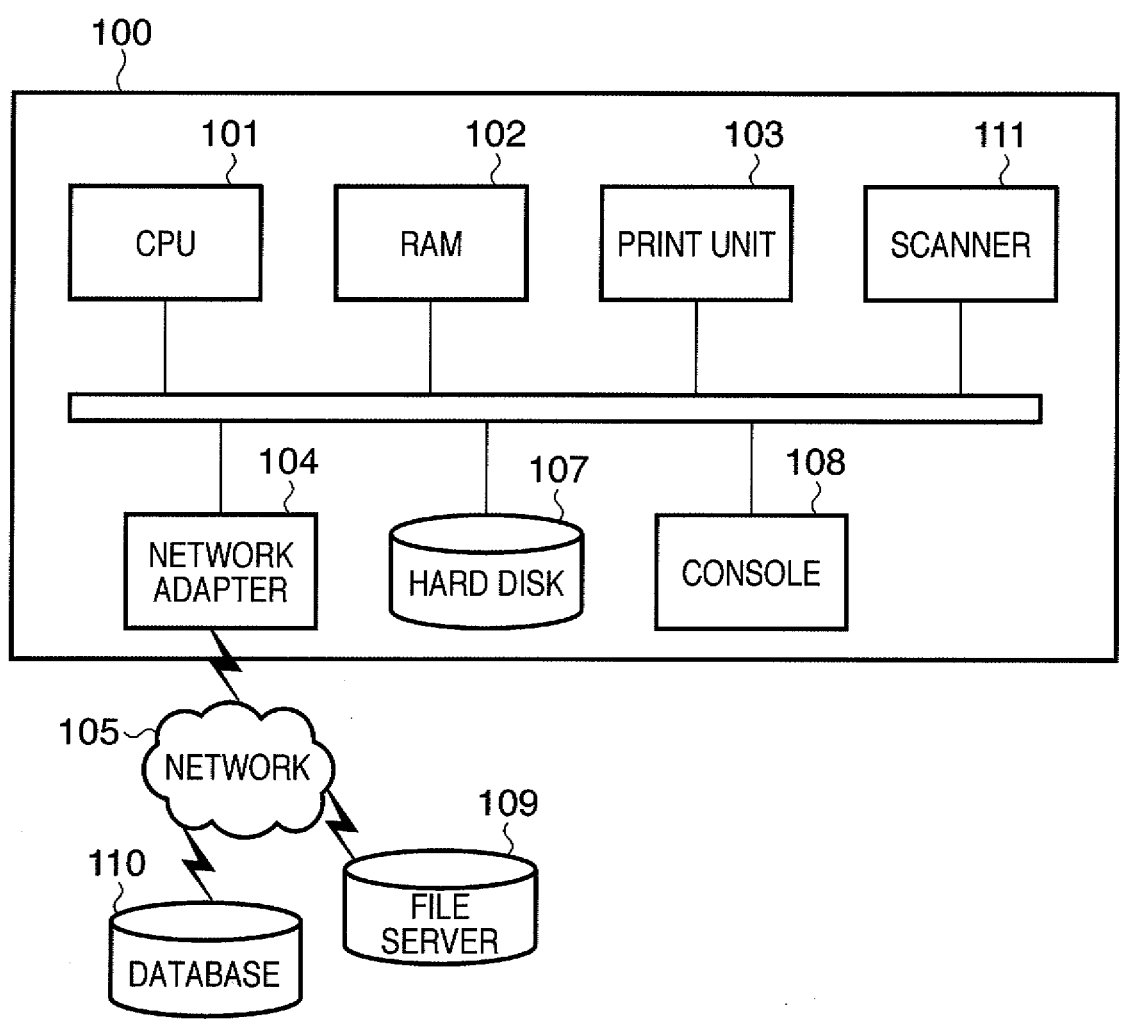
FIG. 1 is a block diagram showing the arrangement of a multi-functional peripheral according to an embodiment of the present invention.

FIG. 1 is a block diagram showing the arrangement of the MFP according to this embodiment. Referring to FIG. 1, reference numeral 101 denotes a Central Processing Unit (CPU) which controls an MFP 100 as a whole. Reference numeral 102 denotes a Random Access Memory (RAM) which temporarily stores programs supplied from an external apparatus or the like, data retrieved from a database, intermediate data during execution of a program, and generated document data.

Reference numeral 107 denotes a hard disk fixed in the MFP 100. The hard disk 107 stores programs for controlling the MFP 100, a program for implementing document generation, generated document data, template data used in document generation, and data retrieval instruction information (to be described later). In addition, the hard disk 107 stores document generation information used in document generation of content data and the like retrieved from a database, a table used to manage association between identification information and document generation information, and the like.

Reference numeral 103 denotes a print unit which executes printing. Reference numeral 108 denotes a console which is operated by the user, and comprises buttons and a display with a touch panel.

Reference numeral 104 denotes a network adapter. The network adapter 104 retrieves data from a database 110 via a network 105, and saves generated document data in a file server 109 via the network 105. Reference numeral 111 denotes a scanner which scans a document.

A method of generating a document using template data which expresses the design of a document, and data retrieval instruction information that describes the retrieval source of character strings, numerical values, graphics, and the like as the contents of a document will be described first.

Figure 2:
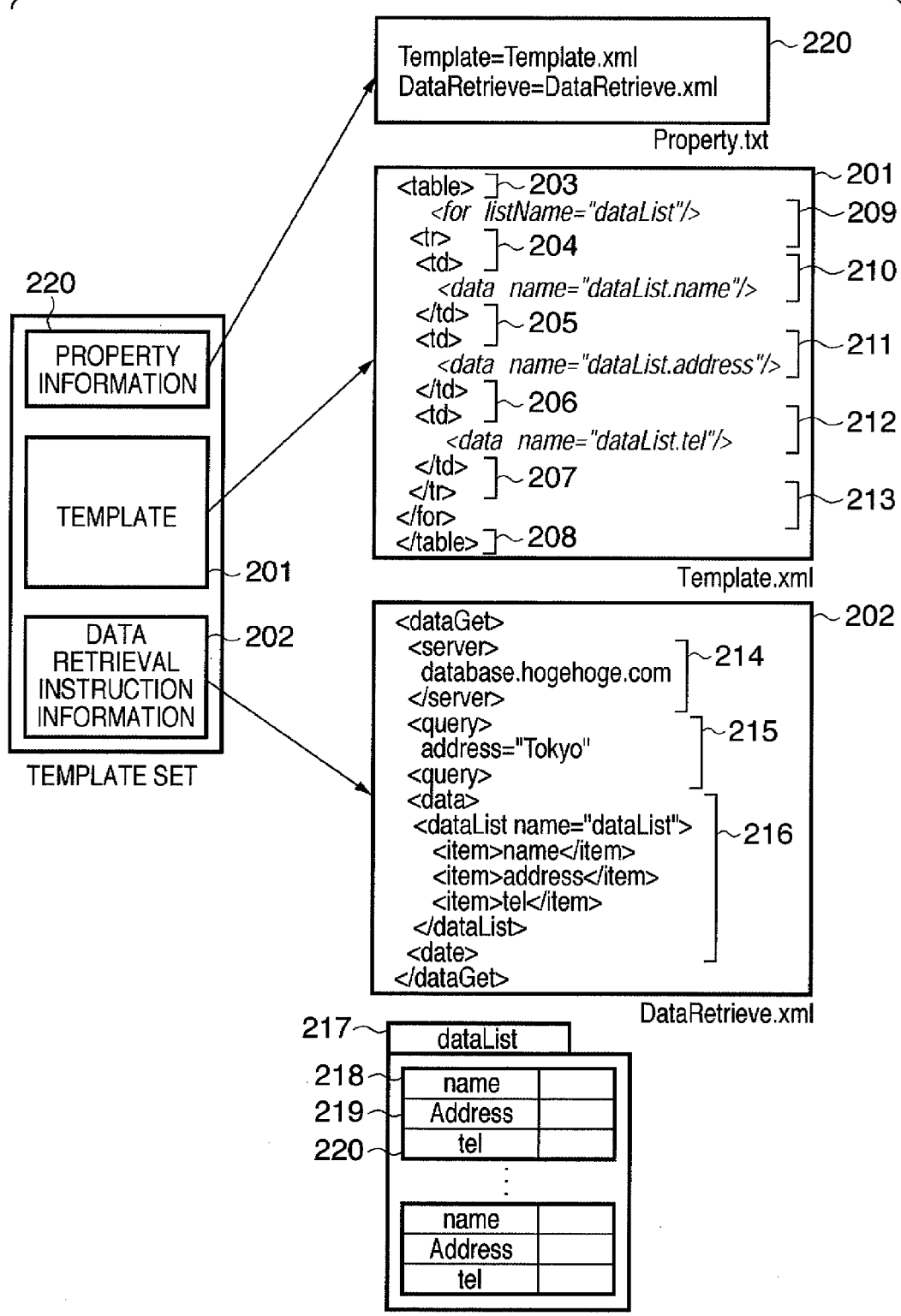
FIG. 2 is a view for explaining a template set.

FIG. 2 is a view for explaining a template set. The template set is one file which combines template data 201 and data retrieval instruction information 202.

The template set includes property information 220, template data 201, and data retrieval instruction information 202. The property information 220 describes configuration information (template data 201 and data retrieval instruction information 202) in the template set. The template data 201 expresses the design of a document. The data retrieval instruction information 202 describes the retrieval source, retrieval condition, and retrieved data contents of content data as the contents of a document.

The property information 220 specifies file names that describe the template data 201 and data retrieval instruction information 202. "Template=Template.xml" in a Property.txt file as the property information 220 indicates that a file "Template.xml" is template data. "DataRetrieve=DataRetrieve.xml" indicates that the data retrieval instruction information is included in the template set with a file name "DataRetrieve.xml".

Furthermore, the data retrieval instruction information 202 describes a name 214 of a database as the content data retrieval source, a retrieval condition 215 required upon retrieving data from the database, and items 216 of content data to be retrieved from the database.

The example of the data retrieval instruction information 202 indicates that data including an item "address"="Tokyo" are retrieved from a server "database.hogehoge.com". Also, this example indicates that data are retrieved as a data list ("dataList") 217 including a "name" element 218, "address" element 219, and "tel" element 220 as data items.

On the other hand, the template data 201 includes pieces of design layout information 203 to 208 and pieces of data merge information 209 to 213 indicating how to merge retrieved content data. For example, the template data 201 has a description for generating a table: a "table" element 203 represents a table, a "tr" element represents a row of the table, and a "td" element represents a column of the table. The contents of the "td" element mean a character string to be included in each cell of the table.

The pieces of data merge information 209 to 213 describe that data included in the data list ("dataList") 217 are extracted one by one. The pieces of data merge information 209 to 213 describe that the "name", "address", and "tel" elements of each of the extracted data are extracted, and are merged with the template data.

A "for" element 209 means that information bounded by the "for" element is repetitively processed as many as the number of retrieved data.

Figure 3:
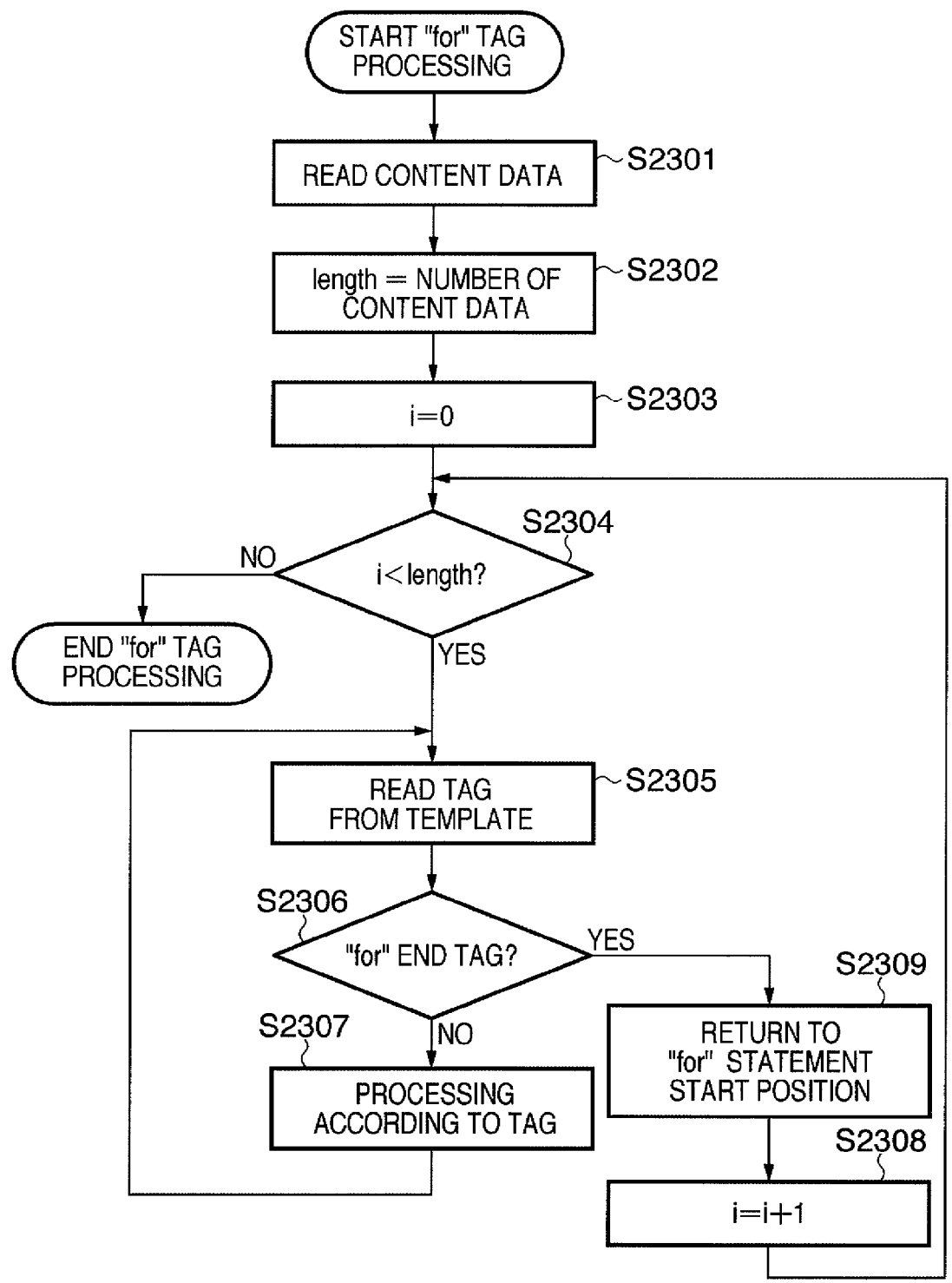
FIG. 3 is a flowchart showing the sequence of processing of a "for" statement.

FIG. 3 is a flowchart showing the sequence of processing of a "for" statement. In step S2301, the CPU 101 reads dataLists as content data retrieved from the database. In step S2302, the CPU 101 substitutes the total number of read dataLists in a "length" variable.

In step S2303, the CPU 101 substitutes "0" in the value of a variable i that holds the number of processed dataLists to initialize the variable i.

The CPU 101 checks in step S2304 if i<length. If it is determined that i<length, the CPU 101 reads template data for one line in step S2305.

The CPU 101 checks in step S2306 if the read tag is a "for" end tag "</for>". If the read tag is a "for" end tag, the CPU 101 returns to a "for" start tag "<for>" to repeat the processing within "for" in step S2309.

The CPU 101 increments the variable i by one in step S2308, and compares "length" indicating the total number of data with the value i in step S2304. As a result of comparison, if a condition is not met, the processing of the "for" tag ends.

On the other hand, if it is determined in step S2306 that the readout data is data other than the "for" end tag, the CPU 101 executes processing corresponding to the readout data. If the readout data is a normal tag such as "<table>", "<tr>", "<td>", or the like that represents the design, the CPU 101 outputs the readout tag as an element that configures a document intact. If the readout data is a "<data>" tag, the CPU 101 inserts content data retrieved from the database at the position of the "<data>" tag.

The processing for merging content data with the template data will be described below. Upon detection of a "<data>" tag, the CPU 101 acquires a "name" property value of the "<data>" tag, and specifies a data item of content data based on the "name" property value. For example, if the "name" property value is "dataList.name", the CPU 101 specifies that the data item of content data is a "name" item of a dataList.

The CPU 101 reads out data of the specified data item from content data. For example, when the "name" property value is "dataList.name", the CPU 101 reads out a "name" value of the i-th dataList retrieved from the database.

The CPU 101 outputs the readout data in place of the "<data>" tag. Therefore, a document in which data of the data item designated by the "name" property value is inserted at the position of the "<data>" tag is generated.

The CPU 101 executes the aforementioned merge processing with respect to descriptions 210, 211, and 212 of the "<data>" tags in the template data 201 in FIG. 2. As a result, content data of "dataList.name", "dataList.address", and "dataList.tel" retrieved from the database are output as the contents of the document in place of the respective tags.

Figure 4:
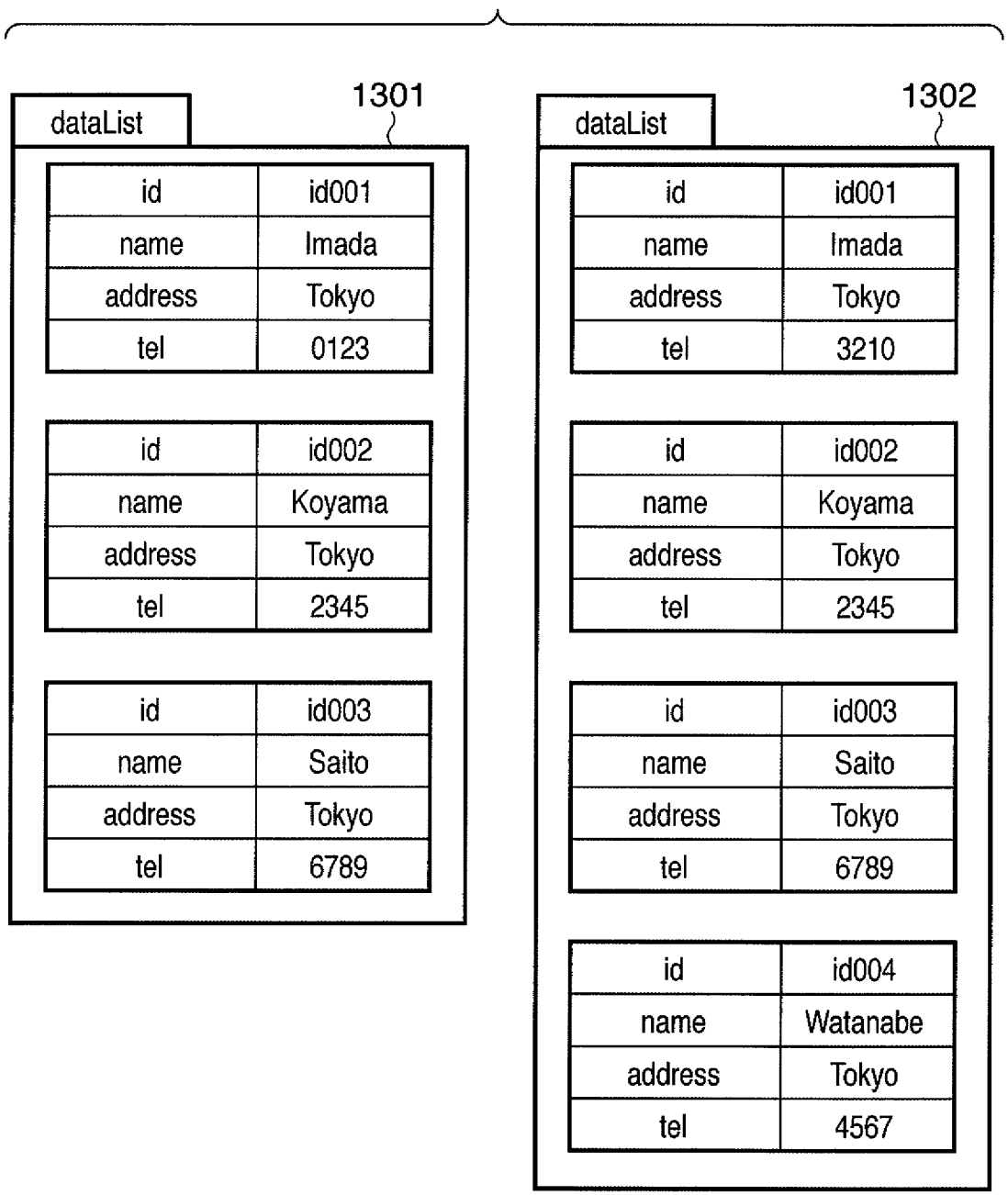
FIG. 4 is a view showing an example of data on a database.

When three sets of data 1301 in FIG. 4 are retrieved from the database, and the processing of a "for" statement is executed, a table of three rows×three columns having "dataList.name", "dataList.address", and "dataList.tel" as information of columns is generated.

As described above, the CPU 101 generates a document by merging content data retrieved from the database with the template data that represents the design information in accordance with an instruction of the data retrieval instruction information 202.

Template sets are stored in the hard disk 107 fixed in the MFP in the form of a list.

Furthermore, pieces of information associated with saving destinations of generated documents are stored in the hard disk 107 in the form of a list.

Of course, the list of template sets, and that of the pieces of information associated with the saving destinations of generated documents may be stored in the external file server 109, and may be retrieved by the network adapter 104 via the network 105.

The console 108 of the MFP will be described below. Of course, the console 108 may have other forms as long as they have similar functions.

The console 108 comprises a display with a touch panel, print start key, and various buttons used to make various operations. The print start key may have different names.

The display with the touch panel displays a selection list user interface for prompting the user to select a template set, and a selection list user interface for prompting the user to select the saving destination of a generated document. These interfaces allow the user to select desired items by touching the lists with a finger or a stylus.

The CPU 101 acquires a list of template sets and a list of saving destination information stored in the hard disk 107. The CPU 101 re-renders the screen of the console 108 to update the selection list user interface of template sets and that of saving destinations of documents.

Figure 5:
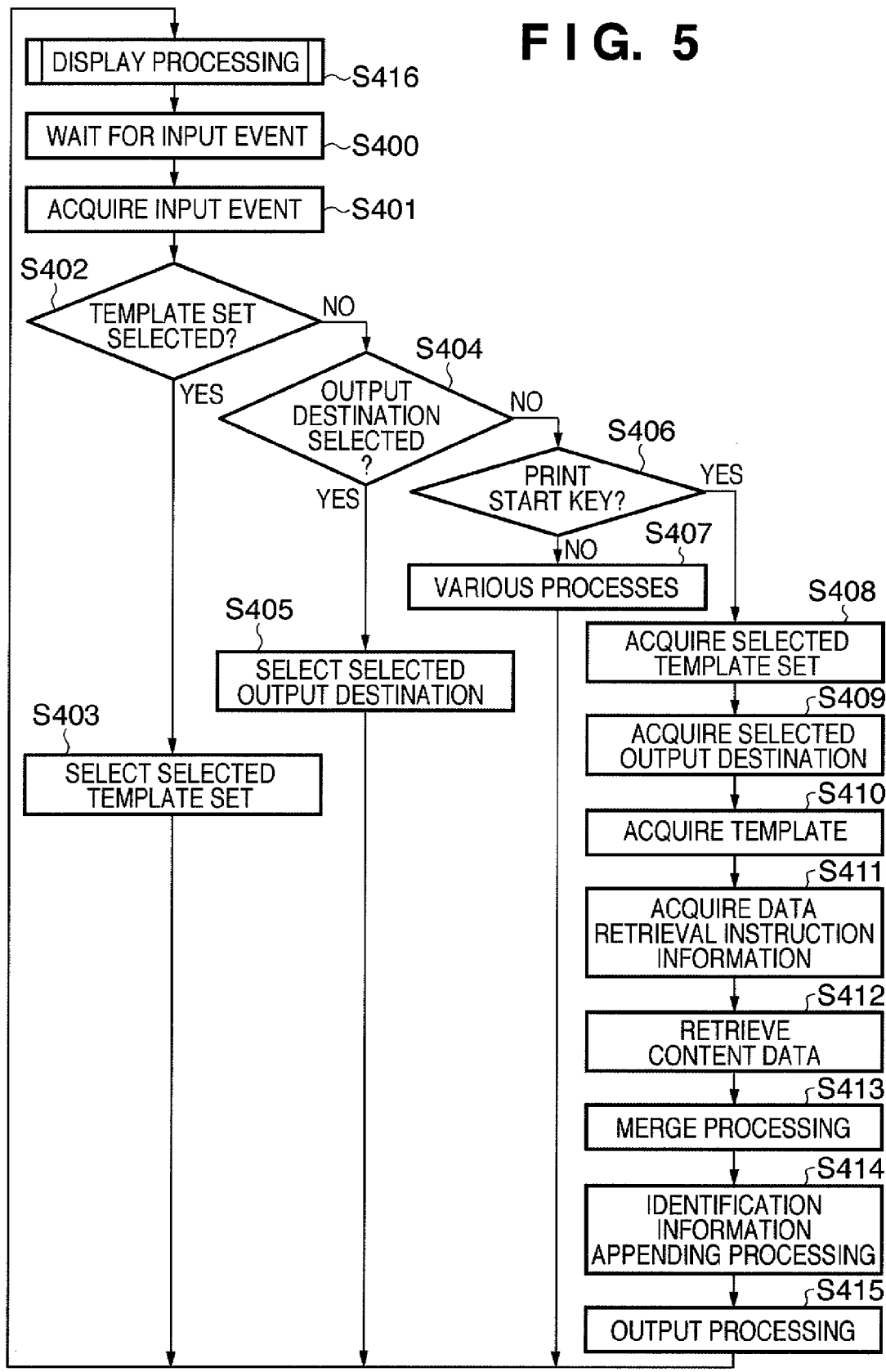
FIG. 5 is a flowchart showing the sequence of document print processing.

The process advances to step S400 in FIG. 4, and the CPU 101 waits for a user's input. FIG. 5 is a flowchart showing the sequence of document print processing.

This program stands by to wait for an input event in step S400 until the user makes an input using the console 108, after the display processing of the selection lists.

Upon detection of a user's input, the CPU 101 executes step S401 to acquire an input event. The CPU 101 checks in step S402 if the acquired input event is a selection input of a template set. If YES in step S402, the CPU 101 executes step S403 to select a template set.

Upon completion of the processing in step S403, the CPU 101 returns the process to step S416 to update the screen, and then waits for a user's input in step S400. If the acquired input event is not a selection input of a template set, the process advances to step S404.

The CPU 101 checks in step S404 if the acquired input event is a selection input of a saving destination (output destination) of a document. If YES in step S404, the CPU 101 executes step S405 to select the saving destination.

Upon completion of step S405, the CPU 101 returns the process to step S416 to update the screen, and then waits for the next user's input in step S400.

If the acquired input event is not a selection input of a saving destination of a document, the CPU 101 advances the process to step S406.

The CPU 101 checks in step S406 if the acquired input event is an input event indicating pressing of the print start key of the console 108. If NO in step S406, the CPU 101 determines that the user has pressed another button, and executes processing corresponding to the pressed button in step S407. The CPU 101 returns the process to step S416 to update the screen, and waits for the next user's input in step S400.

On the other hand, if it is determined in step S406 that the acquired input event is an input event indicating pressing of the print start key, the process advances to step S408. In step S408, the CPU 101 acquires the template set selected in step S403 from the list stored in the hard disk 107.

In step S409, the CPU 101 acquires information of the saving destination (output destination) selected in step S405 from the list stored in the hard disk 107.

In step S410, the CPU 101 acquires template data from the template set acquired in step S408.

In step S411, the CPU 101 acquires data retrieval instruction information from the template set acquired in step S408.

In step S412, the CPU 101 retrieves content data in accordance with the data retrieval instruction information acquired in step S411.

In step S413, the CPU 101 inserts the content data retrieved in step S412 in accordance with data merge information of the template data acquired in step S410. This processing is that shown in FIG. 3.

In step S414, the CPU 101 appends identification information to the document, generation of which is in progress. The identification information is information associated with document generation information used to generate that document such as the template set, data retrieval instruction information, and the like. Using the identification information, the document generation information can be uniquely referred to. Details of step S414 will be described later.

In step S415, the CPU 101 outputs the generated document in accordance with the information of the saving destination (output destination) acquired in step S409.

If the information of the saving destination (output destination) is "print", the print unit 103 in FIG. 1 prints the document. If the information of the saving destination (output destination) is "save", the document is saved in the hard disk

107 in FIG. 1. If the information of the saving destination (output destination) is "send", the document is sent to the file server 109 via the network 105 using the network adapter 104 in FIG. 1.

In step S415, the CPU 101 also executes format conversion processing as needed. For example, the CPU 101 executes processing for performing layout processing of graphics, ruled lines, and character strings by interpreting the design information of the merged document, and converting the document data into PS (Post Script) data, PDF (Portable Document Format) data, or the like.

Upon completion of step S415, the CPU 101 returns the process to step S416 to update the screen, and then waits for the next user's input in step S400.

The hard disk 107 saves an identification information table which associates the identification information with the storage location of a template set. The identification information table associates the identification information with the storage location of a template set in one-to-one correspondence. The identification information associated with the storage location of the template set used in generation of the document is appended to the document in the identification information appending processing in step S414.

The identification information appending processing in step S414 will be described below with reference to FIG. 6.

In step S701, the CPU 101 acquires storage location information of the template set as the document generation information used in generation of the document, and confirms if the acquired storage location information of the template set is registered in the identification information table. The identification information table will also be described in FIG. 7 which shows the sequence of processing for reading a document having identification information and outputting a new document.

If the storage location of the template set is registered in the identification information table, the CPU 101 reads out corresponding identification information (step S705). For example, assume that the storage location of the template set selected by the user exists in the local hard disk 107 expressed by "file:///C:/doc/template1.zip". When this storage location is registered in an identification information table 801 in association with identification information "1234567890", the CPU 101 reads out the identification information "1234567890".

In step S704, the CPU 101 executes processing for inserting the identification information into the document. In this embodiment, the identification information expressed by a numerical value is inserted into the document as a QR code. The QR code is one type of two-dimensional barcodes obtained by encoding information, and developing the encoded information in the vertical and horizontal directions. A predetermined QR code reader decodes the QR code to acquire embedded information.

The processing executed when it is determined in step S701 that the storage location of the template set used in document generation is not registered in the identification information table will be described below.

If the storage location of the template set is not registered in the identification information table, the CPU 101 generates new identification information in step S702. In this embodiment, a new random numerical value which does not exist in the identification information table is generated as identification information. More specifically, if a randomly generated numerical value does not exist in the identification information table, that numerical value is used as identification information.

In step S703, the CPU 101 registers the identification information generated in step S702 and the storage location of the template set in the identification information table in association with each other.

Finally, in step S704 the CPU 101 generates a QR code indicating the identification information, and inserts the generated QR code into the document.

The identification information appending processing in step S414 of FIG. 5 has been described. However, the embodiment of the present invention is not limited to this. For example, in this embodiment, a random numerical value is used as identification information. However, the storage location information itself of the template set used in document generation may be used as identification information. In this case, in the identification information appending processing in step S414, the storage location information of the template set is converted into a QR code, and that QR code is appended to the document.

Since it is inefficient to execute processing for generating a QR code each time, a generated QR code may be registered in the identification information table together with the identification information and the storage location information of the template set. Upon generation of a QR code using the storage location information of the template set as identification information as well, that QR code may be registered in the table in association with the storage location information of the template set.

When the document is generated as a digital file without being printed out, the identification information may be converted into a QR code, and the QR code may be inserted as information to be displayed on a paper sheet. Alternatively, in such case, the identification information may be inserted as property information of the generated digital document file. Some digital document files have an area for holding information such as a title, preparer, keywords, comment, summary, and the like of a document as property values. As that property information, the identification information is held.

The method of reading a document having identification information and outputting a new document will be described below.

Figure 7:
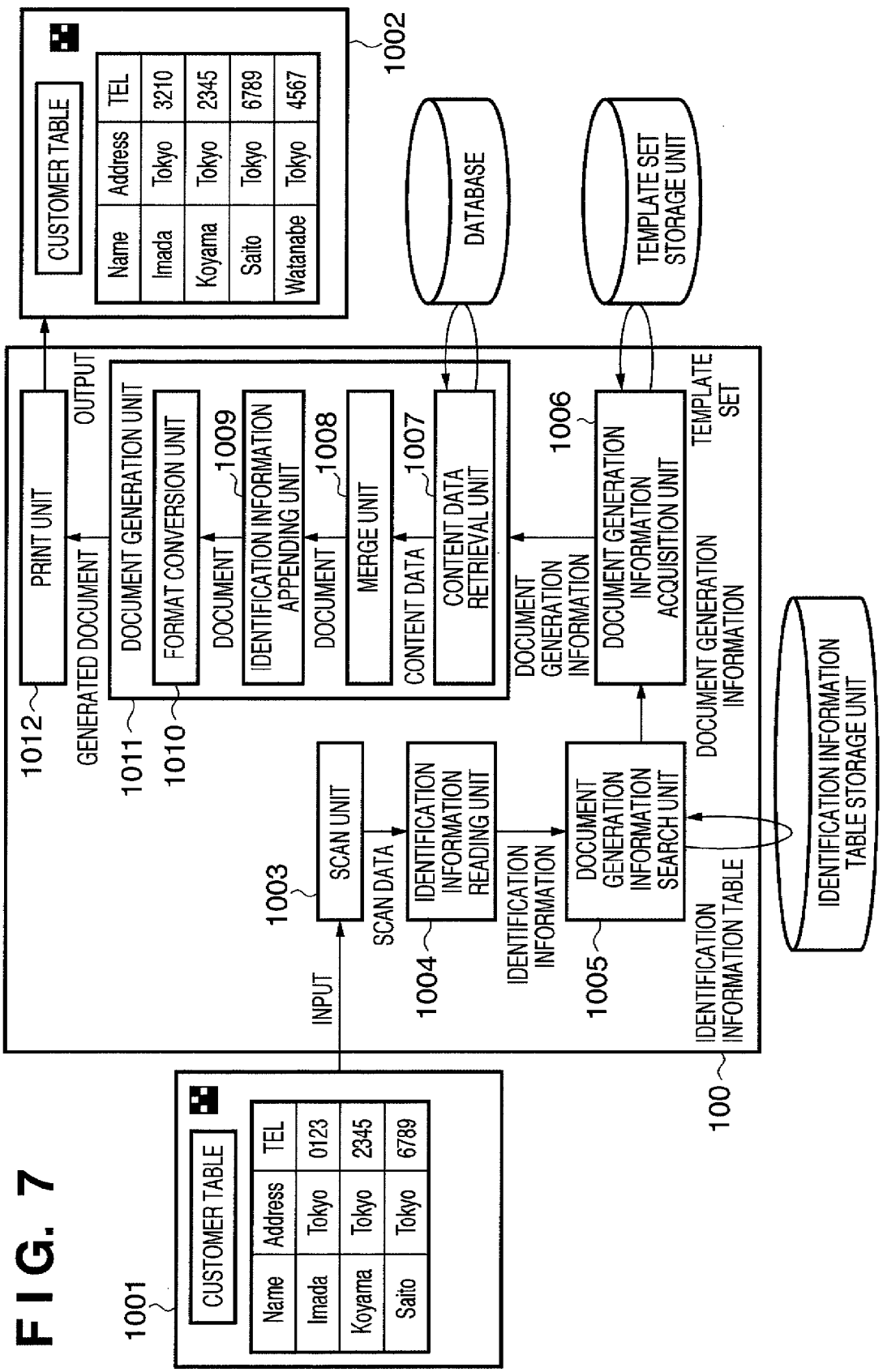
FIG. 7 is a block diagram showing the sequence of processing for reading a document having identification information, and outputting a new document.

FIG. 7 is a block diagram showing the sequence of processing for reading a document having identification information and outputting a new document. Respective units in FIG. 7 will be described below.

A scan unit 1003 converts an image on a scanned paper sheet 1001 into digital image data using the scan function of the MFP 100.

An identification information reading unit 1004 extracts and decodes a QR code from the digital image data obtained by scanning.

A document generation information search unit 1005 searches an identification information table storage unit for information required to retrieve document generation information used in document generation based on the identification information acquired by decoding the QR code.

A document generation information acquisition unit 1006 acquires document generation information from a template set storage unit based on the information obtained by the document generation information search unit 1005.

A document generation unit 1011 generates a document using the template set.

A content data retrieval unit 1007 accesses a data retrieval source (database) based on the data retrieval source, retrieval condition, and retrieved data contents indicated by data retrieval instruction information in the template set, and retrieves content data.

A merge unit 1008 merges the content data with template data. An identification information appending unit 1009 embeds, in a document, identification information associated with the document generation information used upon generating the document.

A format conversion unit 1010 converts the format of the document generated up to the identification information appending unit 1009.

A print unit 1012 executes processing for printing out the generated document on a paper sheet 1002 using the print function of the MFP 100.

Figure 8:
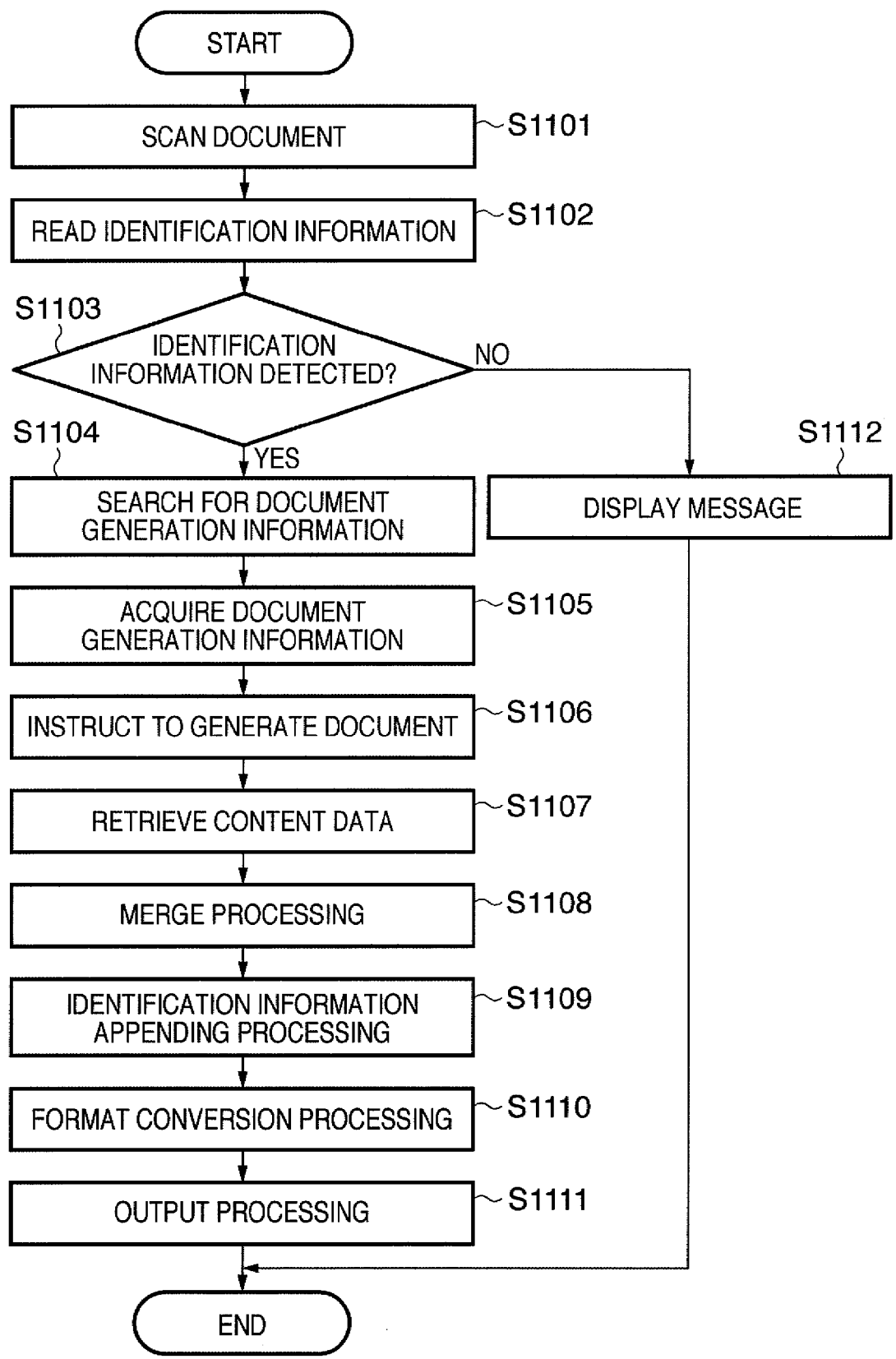
FIG. 8 is a flowchart showing the sequence of document generation processing.

FIG. 8 is a flowchart showing the sequence of document generation processing. The document generation processing will be described below with reference to FIG. 8. Note that this processing is executed premised on that the MFP is set not in a mode of executing a normal scan function of the MFP but in a mode of acquiring identification information appended to a scanned document, and generating a document using the acquired information. When the MFP is set in the mode of executing the normal scan function, data of a scanned paper sheet is converted into digital image data, and the digital image data is saved.

In step S1101, the scan unit 1003 scans a paper document placed on an document table of the MFP, converts it into digital image data, and passes the converted digital image data to the identification information reading unit 1004.

In step S1102, the identification information reading unit 1004 extracts an embedded part of a QR code from the digital image data passed from the scan unit 1003, and decodes the QR code to acquire identification information. The identification information reading unit 1004 passes the acquired identification information to the document generation information search unit 1005.

The identification information reading unit 1004 then checks if the QR code can be detected from the digital image data (step S1103). If the QR code cannot be detected from the digital image data, the identification information reading unit 1004 displays a message that informs the user that no identification information is included on the display 108 of the MFP (step S1112), thus ending the processing. Note that the reason why the QR code cannot be detected from the digital image data is that the scanned paper sheet does not include any QR code.

In step S1104, the document generation information search unit 1005 reads out and refers to an identification information table saved in the identification information table storage unit of the hard disk 107 to search for document generation information corresponding to the identification information passed from the identification information reading unit 1004. In the identification information table, assume that storage location information "file:///C:/doc/template1.zip" of a template set is associated with identification information "1234567890" passed from the identification information reading unit 1004. In this case, "file:///C:/doc/template1.zip" is retrieved as document generation information.

The document generation information search unit 1005 passes the retrieved document generation information to the document generation information acquisition unit 1006. As described above, when the identification information itself is storage location information of a template set, the identification information itself is passed to the document generation information acquisition unit 1006 intact.

In step S1105, the document generation information acquisition unit 1006 accesses the storage location (storage unit) of the template set retrieved by the document generation information search unit 1005 to acquire a template set used in document generation. When the storage location information of the template set is "file:///C:/doc/template1.zip", a "template1.zip" file saved in the designated directory of the hard disk 107 of the MFP is acquired.

The document generation information acquisition unit 1006 passes the acquired "template1.zip" file to the document generation unit 1011. When the storage location information of the template set designates an external file server, the document generation information acquisition unit 1006 accesses a template set storage unit of the designated external file server via the network adapter 104 to retrieve the corresponding template set. Assume that the "template1.zip" file archives template data "Template.xml" and data retrieval instruction information "DataRetrieve.xml".

In step S1106, the document generation unit 1011 instructs respective units to execute generation processing of a document using the document generation information passed from the document generation information acquisition unit 1006.

The document generation unit 1011 extracts data retrieval instruction information and template data used in document generation from the passed template set. The document generation unit 1011 passes the data retrieval instruction information to the content data retrieval unit 1007 to instruct it to retrieve content data. The document generation unit 1011 passes the template data to the merge unit 1008 to instruct it to merge the template data and content data.

Upon reception of "template1.zip" as the template set, the document generation unit 1011 passes the data retrieval instruction information "DataRetrieve.xml" to the content data retrieval unit 1007. Also, the document generation unit 1011 passes the template data "Template.xml" to the merge unit 1008.

In step S1107, the content data retrieval unit 1007 interprets the passed data retrieval instruction information, and retrieves content data by accessing a retrieval source in accordance with data items and data retrieval conditions designated in a file. The practical retrieval method is as has been described using FIG. 2. The content data retrieval unit 1007 passes the retrieved content data to the merge unit 1008.

In step S1108, the merge unit 1008 generates a document by merging the template data and the content data passed from the content data retrieval unit 1007. The practical method is as has been described using FIG. 2. The merge unit 1008 passes the merged document to the identification information appending unit 1009.

In step S1109, the identification information appending unit 1009 appends identification information to the document passed from the merge unit 1008. Since the identification information appending processing is executed by the same method as the appending processing method described using FIG. 6, a description thereof will not be repeated. However, in this embodiment, since the identification information has already been detected in step S1102 without any necessity of detecting identification information based on the storage location of the template set using the identification information table, only the processing for converting the identification information into a QR code is executed. Furthermore, in the identification information appending method described using FIG. 6, when the QR code itself is stored in association with the storage location information of the template set in the identification information table, only the processing for reading out the QR code from the identification information table and appending the readout QR code is executed without generating any QR code. The identification information appending unit 1009 passes the document appended with the QR code to the format conversion unit 1010.

In step S1110, the format conversion unit 1010 executes format conversion processing of the document passed from the identification information appending unit 1009. In case of this embodiment, since the document is to be printed out, the format conversion unit 1010 converts the format of the document into a printer language that the MFP can interpret. For example, in case of a PS printer, conversion processing into PS data is executed. When the document is to be saved in the hard disk, the document is converted into a format such as PDF, JPEG (Joint Photographic Experts Group), or the like, which are easy to use, after the document is sent using e-mail or is saved in the file server. As for the format to be converted, a GUI (Graphical User Interface) that prompts the user to select a format may be provided, and the document may be converted into the format designated by the user via the GUI.

The format conversion unit 1010 passes the format-converted document to the print unit 1012.

In step S1111, the print unit 1012 prints out the document passed from the format conversion unit 1010 onto a paper sheet. This processing is normal print processing of the MFP, and the print unit 1012 prints the document by interpreting, for example, PS data converted by the format conversion processing.

As described above, according to this embodiment, a document having identification information is scanned. Then, a document that includes latest content data retrieved by accessing the database can be generated using a template set used upon generation of the scanned original document.

Figure 9:
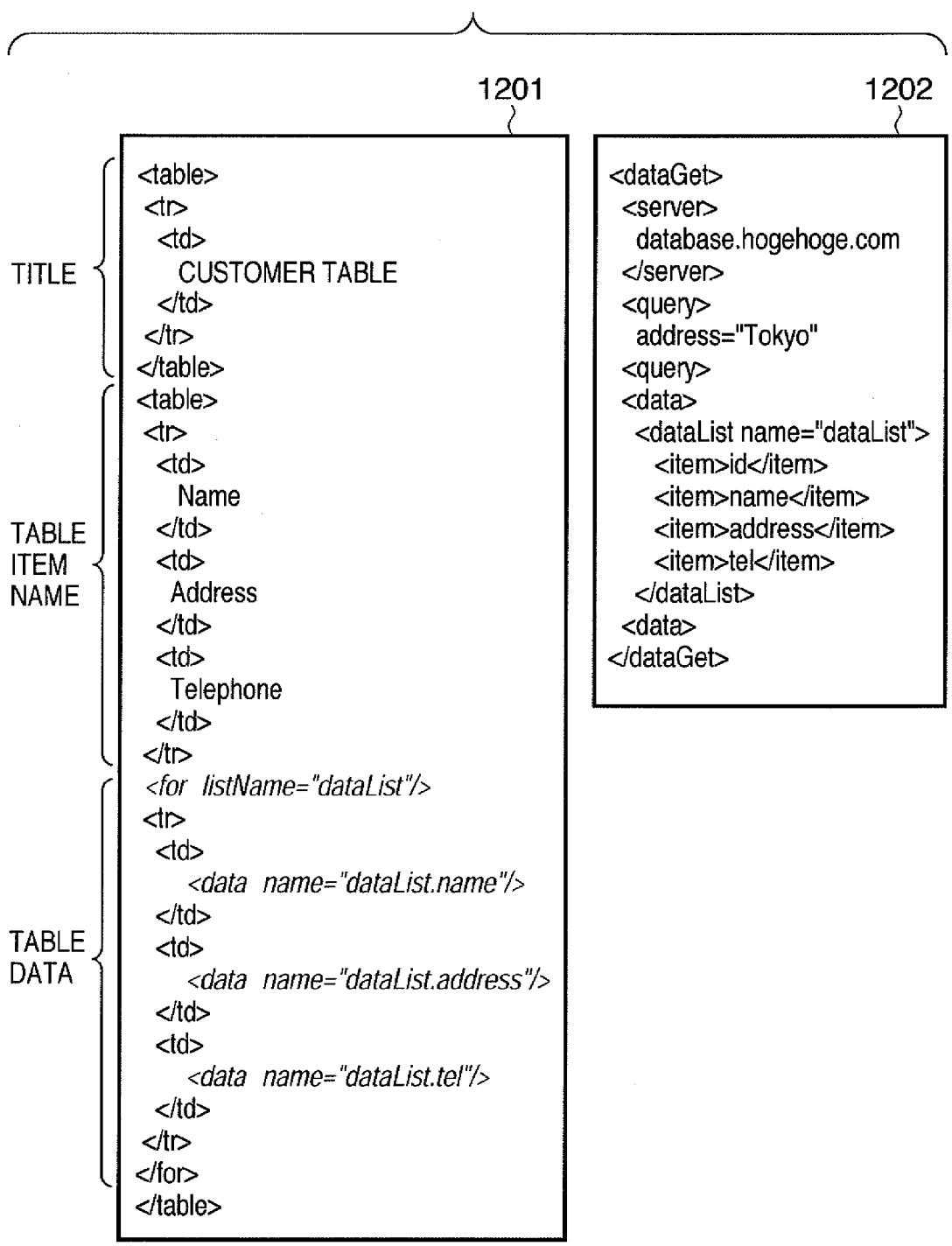
FIG. 9 is a view showing an example of a template set.
Figure 10:
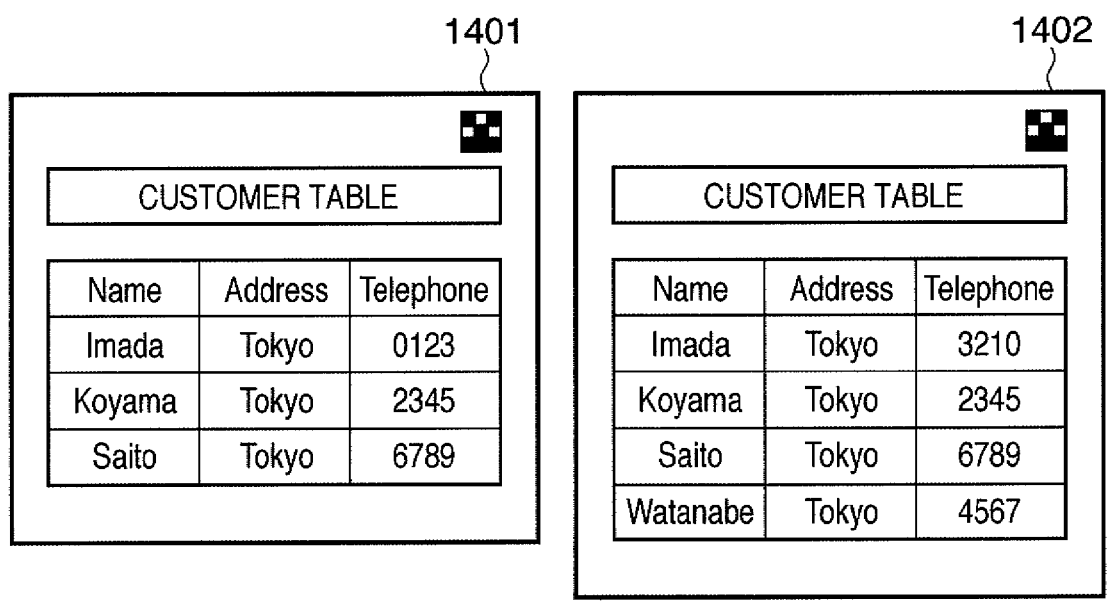
FIG. 10 is a view showing examples of documents to be generated.

In order to explain a document to be generated more practically, FIG. 9 shows an example of a template set, and FIG. 10 shows an example of a generated document. Data in a database are common to those in FIG. 4.

FIG. 9 shows an example of template data 1201, and that of data retrieval instruction information 1202. Based on the template data 1201, a document including table data configured by a title line "CUSTOMER TABLE", table item names "Name", "Address", and "Telephone", and data retrieved from the database is generated. The data retrieval instruction information 1202 means data "name", "address", and "tel" having a value of "address"="Tokyo" are retrieved from "database.hogehoge.com" in association with dataList data.

FIG. 4 shows data 1301 on the database at the time of generation of an original document, and shows data 1302 on the database at the time of generation of a new document by scanning the original document.

FIG. 10 shows documents generated using the template set shown in FIG. 9, and the data on the database shown in FIG. 4.

Reference numeral 1401 denotes a document generated when the database has the data 1301. On the document 1401, data of customers "Imada", "Koyama", and "Saito" included in the data 1301 appear. A document 1402 is generated when the database has the data 1302. On the document 1402, data of a new customer "Watanabe", which is added to the database, is added to the data of the customers "Imada", "Koyama", and "Saito". Since "tel" data associated with "Imada" in the database has changed, a table on which "tel" data is changed to "3210" is generated.

The scanned original document is the document 1401. The template data "Template.xml" of the template set "Template1.zip" is the template data 1201. The data retrieval instruction information "DataRetrieve.xml" is the data retrieval instruction information 1202. The data on the database upon generation of the original document are the data 1301. The data on the database upon generation of a new document by scanning the original document 1401 are the data 1302. In such case, the new document 1402 is printed out.

In the first embodiment of the present invention, a document on the paper sheet of which identification information is printed as a QR code is input as an original document. However, identification information may be stored in, for example, an RFID tag embedded in a paper sheet in place of a QR code, and the identification information saved in an original document may be read by an RFID tag reader.

Also, an original document may be a digital document, and the MFP may read identification information appended as property information of the digital document by interpreting the digital document. In this case, input of a digital document having identification information is implemented by a method of sending such document from an external computer to the MFP, a method of retrieving that document from an external server, a method of reading out the document stored in the hard disk drive of the MFP, and the like.

In the first embodiment of the present invention, the generated original document is printed by the print unit of the MFP, and is output as a paper sheet. However, the present invention is not limited to such printed document, but a new document generated as a file may be saved in the hard disk of the MFP or an external file server.

In the first embodiment of the present invention, identification information is appended to a document generated using a template set designated by that identification information. However, if identification information used to derive a template set is appended to a paper sheet, a new document can be generated by scanning that paper sheet. Therefore, a target to be appended with identification information need not be limited to a document generated from a template set.

The second embodiment of the present invention will be described hereinafter. In the aforementioned first embodiment, identification information is generated to have one-to-one correspondence with a template set. That is, when an identical template set is used, a QR code generated based on identical identification information is appended to an original document.

The identification information is generated for each document generation information (a template set, data retrieval source, data acquisition condition, data item contents). Therefore, when a document is generated based only on information of a template set like in the first embodiment, the template set and identification information have one-to-one correspondence. Upon generating original documents using an identical template set, identical identification information is appended to the original documents.

The second embodiment will exemplify a case in which means that allows the user to input a data retrieval condition is provided, and an original document is generated based on the input data retrieval condition and a template set. In the first embodiment, since document generation information is only a template set, identification information is generated for each template set. However, since two pieces of information, that is, a template set and data retrieval condition input by the user correspond to document generation information, identification information is generated for these two pieces of information. That is, when an identical template set is used, and the data retrieval condition acquired based on the user's input matches it, identical identification information is appended to original documents.

The second embodiment implements retrieval of data from a database by changing a data retrieval condition designated by data retrieval instruction information of a template set or by adding a new data retrieval condition upon generation of an original document.

For example, data retrieval instruction information 202 in FIG. 2 instructs to retrieve data from the database under a data retrieval condition in which "address"="Tokyo". In this case, customer data including "address"="Tokyo" are retrieved from the database. The user may want to retrieve customer data including "address"="Kanagawa". In this case, template data including data retrieval instruction information in which a data retrieval condition in which "address"="Kanagawa" is specified is prepared. Furthermore, this embodiment can be implemented by providing means that allows the user to designate a data retrieval condition to be input in the same manner as the method of prompting the user to select a template set and output designation (S402, S404 in FIG. 5).

The second embodiment will explain a mode in which means for accepting a user's input is provided, and data are retrieved from the database using the input data acquisition condition together with data retrieval instruction information.

An example of a GUI of a console 108 that allows the user to input a data retrieval condition will be described below. This GUI comprises a text field, priority information selection list, "set" button, and "cancel" button. The text field is an input field used to designate a data retrieval condition. The priority information selection list is used to select a processing method when a data retrieval condition described in data retrieval instruction information and that input via the GUI are redundant. The "set" button is used to give the instruction to settle inputs. The "cancel" button is used to give the instruction to cancel input data.

The text field and priority information selection list are GUI components. The respective GUI components are a component for accepting an input character string, and a component for selecting one of a plurality of items displayed in a list. Upon expanding the priority information selection list, selection items are displayed.

When the user inputs as a data retrieval condition that "address" of dataList data is "Kanagawa", he or she inputs "dataList.address=Kanagawa" in the text field.

In this embodiment, the priority information selection list includes selection items "input priority", "template set priority", "AND", and "OR".

The selection item "input priority" means that when the input data retrieval condition and that designated by data retrieval instruction information are those associated with an identical data item, the condition of the data retrieval instruction information is ignored, and the input data retrieval condition is adopted.

The selection item "template set priority" means that when the input data retrieval condition and that designated by data retrieval instruction information are those associated with an identical data item, the data retrieval condition input via the GUI is not used in data retrieval. That is, this item means that the data retrieval instruction information is prioritized contrary to "input priority".

The selection item "AND" means that data are retrieved under a condition obtained by calculating the logical product "AND" of the data retrieval condition input via the GUI and that designated by data retrieval instruction information.

The selection item "OR" means that data are retrieved under a condition obtained by calculating the logical sum "OR" of the data retrieval condition input via the GUI and that designated by data retrieval instruction information.

The "set" button is used to settle the data retrieval condition input via this GUI.

The "cancel" button is used to clear the input data retrieval condition. Upon pressing the "cancel" button, a character string input to the text field is cleared, and the selection list is set in a non-selected state without any selected items.

Figure 11:
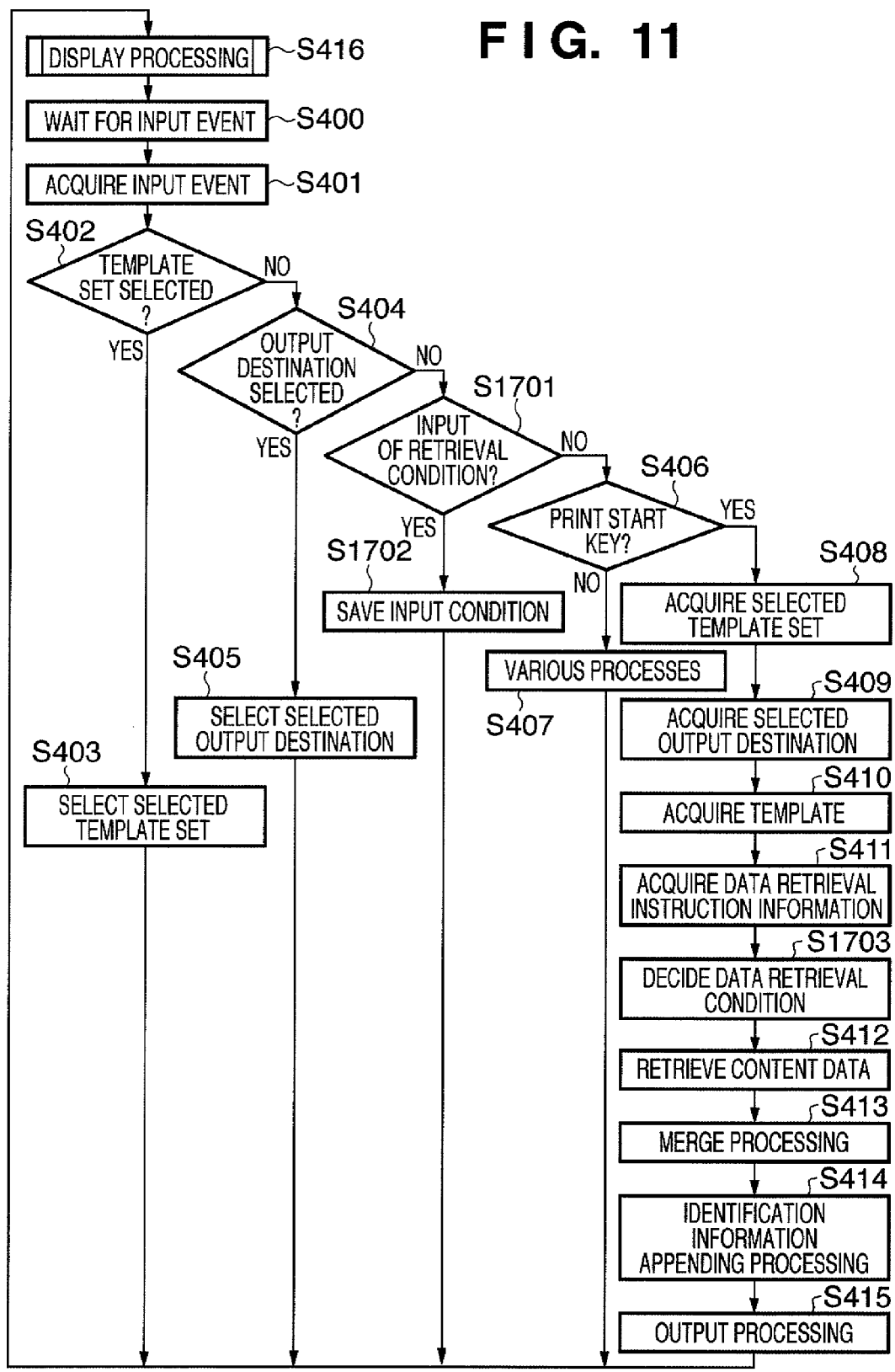
FIG. 11 is a flowchart showing the processing until an original document is generated.

FIG. 11 is a flowchart showing the processing until an original document is generated. In this flowchart, the sequence of processing for accepting a data retrieval condition input by the user is added to that of the first embodiment shown in FIG. 5. Since the sequence of the processing other than that for inputting the data retrieval condition is the same as that shown in FIG. 5, different processes upon adding that for inputting the data retrieval condition will be described.

In step S401, a CPU 101 acquires an input event. Assume that the input event is an input of a data retrieval condition. In this case, the CPU 101 checks in step S1701 if the input is associated with a data retrieval condition, and the process advances to step S1702.

In step S1702, the CPU 101 saves the entry in the text field as a data retrieval condition, and information selected from the priority information selection list as priority information. The CPU 101 returns the process to step S416 to update the screen, and then waits for a user's input in step S400.

In step S1703, the CPU 101 determines a data retrieval condition upon retrieving data from the database using the data retrieval condition designated by data retrieval instruction information, and the data retrieval condition and priority information input in step S1702. A method of deciding the data retrieval condition will be described below.

The CPU 101 acquires the data retrieval condition designated by the data retrieval instruction information, and the data retrieval condition and priority information input by the user.

The former data retrieval condition is that extracted from the data retrieval instruction information. The latter data retrieval condition is that saved in step S1702.

The CPU 101 checks if the data retrieval condition described in the data retrieval instruction information and that input by the user include redundant data items. If these conditions do not include redundant data items, the CPU 101 retrieves data in step S412 using both the data retrieval conditions. However, if these conditions include redundant data items, the CPU 101 checks if the data retrieval conditions include different values. If these conditions include different values, the CPU 101 determines a data retrieval condition according to the priority information.

A practical example will be described below. Assume that the data retrieval condition designated by the data retrieval instruction information, and that input by the user are respectively "dataList.address=Tokyo" and "dataList.address=Kanagawa". The two data retrieval conditions designate the same data item "dataList.address". As for this data item, one condition is contingent upon "matching with Tokyo", and the other condition is contingent upon "matching with Kanagawa", that is, these conditions are different. In this case, which of the two conditions is prioritized is determines based on the priority information. If the retrieval conditions do not include the same item, the CPU 101 designates both the retrieval conditions, and retrieves content data from the database.

When the priority information is "input priority", the data retrieval condition "dataList.address=Kanagawa" designated by the data retrieval instruction information is not used. On the other hand, the data retrieval condition "dataList.address=Tokyo" input by the user is determined as a final data retrieval condition.

When the priority information is "template set priority", the data retrieval condition designated by the data retrieval instruction information is used. Hence, a final data retrieval condition is "dataList.address=Tokyo" designated by the data retrieval instruction information.

When the priority information is "AND", the logical product of the two designated data retrieval conditions is decided as a data retrieval condition. That is, a data retrieval condition is to retrieve data in which both "Tokyo" and "Kanagawa" are designated as the values of "dataList.address".

When the priority information is "OR", the logical sum of the two designated data retrieval conditions is determined as a data retrieval condition. That is, a data retrieval condition is to retrieve data in which the value of "dataList.address" is "Tokyo" or "Kanagawa".

In step S1703, the CPU 101 determines the data retrieval condition by the aforementioned method. In step S412, the CPU 101 retrieves data using the determined data retrieval condition.

After the data retrieval processing, the CPU 101 executes merge processing in step S413, identification information appending processing in step S414, and output processing in step S415 as in the first embodiment, thus generating an original document.

Figure 6:
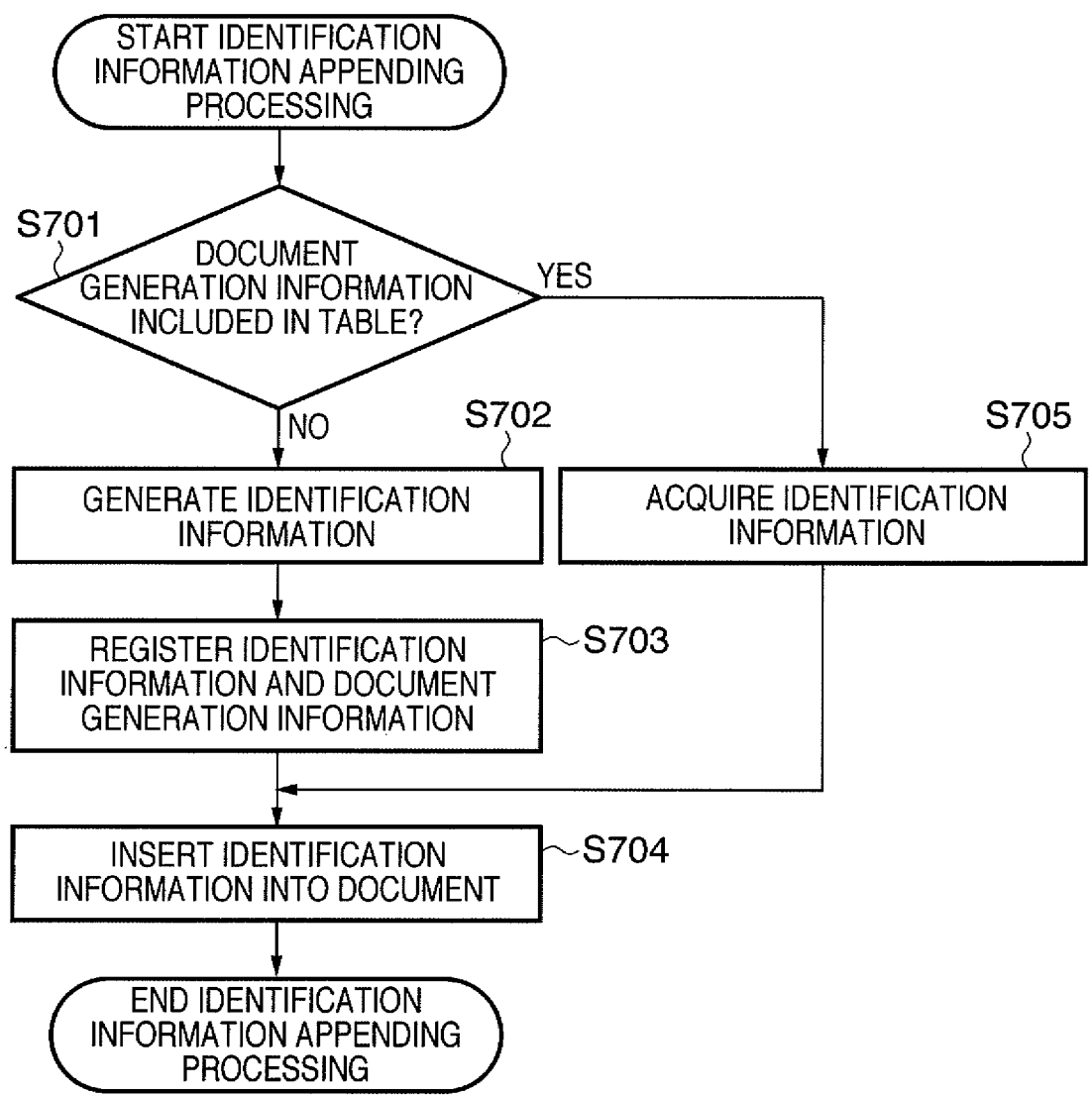
FIG. 6 is a flowchart showing the sequence of identification information appending processing.

In the identification information appending processing in step S414, the CPU 101 appends identification information to a document by the processing shown in FIG. 6. However, since information used in document generation, that is, document generation information is different from the first embodiment, an identification information table manages different information.

In the first embodiment, since document generation is done using only a template set, information to be stored in the table in association with identification information is only the storage location of the template set. By contrast, in the second embodiment, means that allows the user to set a data retrieval condition is provided, and the data retrieval condition input by the user is dynamically set in addition to the template set. Therefore, the finally used data retrieval condition is stored in association with identification information in addition to the storage location of the template set.

An identification information table in the second embodiment associates the storage location of the template set and the data retrieval condition with the identification information. For example, a storage location "file:///C:/doc/template1.zip" of a template set and a data retrieval condition "Address=Kanagawa" are stored in association with identification information "1234567890". This means that the identification information "1234567890" is appended to a document generated using the template file "file:///C:/doc/template1.zip" and data retrieval condition "Address=Kanagawa".

This identification information table is used to search for document generation information used to generate an original document. The CPU 101 searches this identification information table for identification information scanned from an original document, and acquires storage location information of a template set and a data retrieval condition associated with the identification information. Then, the CPU 101 generates a new document using these pieces of acquired information. For example, upon scanning an original document having identification information "1234567890", the CPU 101 generates a new document using a template set "file:///C:/doc/template1.zip" and a data retrieval condition "dataList.address=Kanagawa".

As described above, even when an identical template set is used, different identification information is appended to an original document generated using a different data retrieval condition. A new document is also generated using the same template set and data retrieval condition used to generate the original document.

The third embodiment of the present invention will be described hereinafter. The third embodiment of the present invention will explain a method of generating a new document which specifies different content data from an original document.

Figure 12:
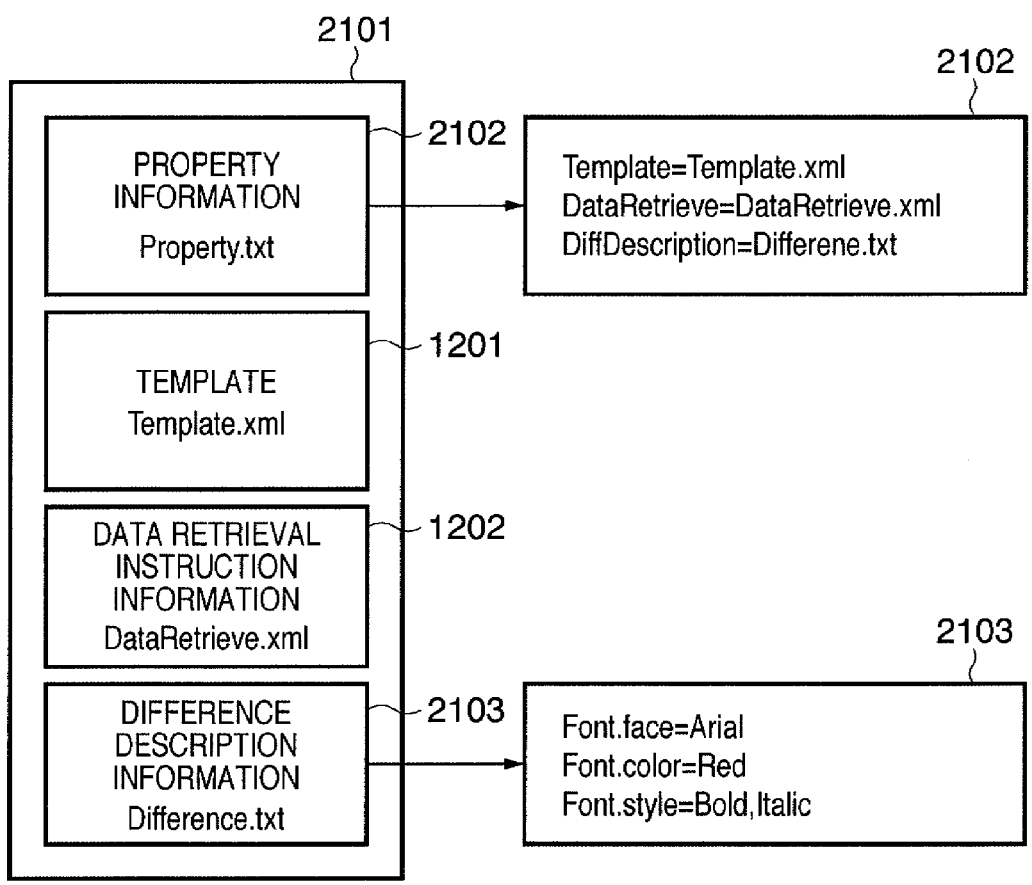
FIG. 12 is a view showing an example of a template set.

A template set used in document generation will be described first. FIG. 12 is a view showing an example of a template set. A template set 2101 includes property information "Property.txt" 2102, template data "Template.xml" 1201, data retrieval instruction information "DataRetrieve.xml" 1202, and difference description information "Difference.xml" 2103.

The template data 1201 and data retrieval instruction information 1202 are the same as those shown in FIG. 2. The property information 2102 describes the processes which use respective files in the template set.

"Template=Template.xml" indicates that template data used in document generation is "Template.xml".

"DataRetrieve=DataRetrieve.xml" indicates that data retrieval instruction information used in document generation is "DataRetrieve.xml".

"DiffDescription=Difference.txt" indicates that difference description information that describes a content data description method different from an original document upon generation of a new document is "Difference.txt".

The difference description information specifies how to display different content data when content data used to generate an original document and those retrieved from the database upon generation of a new document have differences.

The "Difference.xml" 2103 as an example of the difference description information specifies Font information used to describe different data. "Font.face=Arial" specifies use of Arial as a font. "Font.color=Red" specifies use of red as the color of a character string. "Font.style=Bold, Italic" specifies to express a character string using a bold & italic face. Content data different from the original document are updated by the font specified in the difference description information.

An example of a new document upon using this template set will be described below. This new document is generated by scanning an original document 1401 shown in FIG. 10. The new document is generated when content data upon generation of the original document are updated from data 1301 to data 1302 shown in FIG. 4 upon generation of the new document. In a database upon generation of the new document, "tel" data of "id001" shown in FIG. 4 is updated from "0123" to "3210", and data of "id004" are newly added. Therefore, on the new document, a telephone number "3210" for "Imada" and pieces of customer information "Watanabe", "Tokyo", and "4567" of newly added "id004" are described. These pieces of information are expressed using a description "Arial, red, and bold & italic face" designated by the difference description information.

Figure 13:
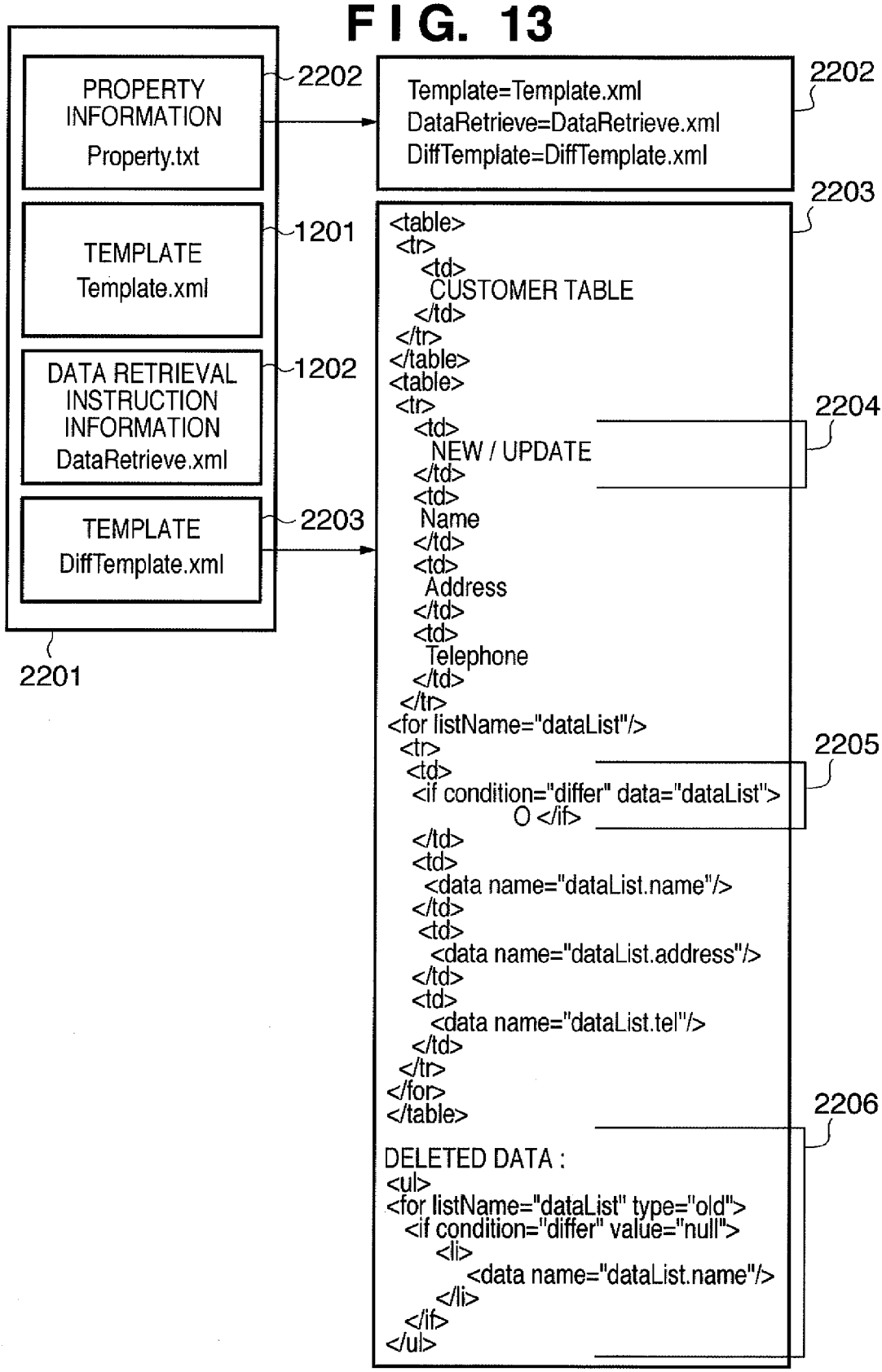
FIG. 13 is a view showing an example of a template set.

FIG. 13 is a view showing an example of a template set that describes a method of describing differences from content data of an original document as in FIG. 12. This template set designates use of template data different from that used upon generation of an original document in generation of a new document.

A template set 2201 includes property information "Property.txt" 2202, template data "Template.xml" 1201, data retrieval instruction information "DataRetrieve.xml" 1202, and template data "DiffTemplate.xml" 2203. The template data "Template.xml" 1201 and data retrieval instruction information "DataRetrieve.xml" 1202 are the same as those shown in FIG. 9. The property information "Property.txt" 2202 describes the processes which use respective files in the template set.

As in the example of FIG. 12, "Template=Template.xml" means that "Template.xml" is used as template data upon generation of a document. "DataRetrieve=DataRetrieve.xml" means that "DataRetrieve.xml" is used as data retrieval instruction information. "DiffTemplate=DiffTemplate.xml" means that "DiffTemplate.xml" is used as template data upon generation of a new document. In the template set 2101 shown in FIG. 12, the "Template.xml" 1201 is used as template data upon generation of a new document. However, unlike in FIG. 12, in the template set 2201 shown in FIG. 13, the "DiffTemplate.xml" 2203 is used.

The template data "DiffTemplate.xml" 2203 indicates to lay out a table configured by dataList.name, dataList.address, and dataList.tel data retrieved from the database. This table further has a "NEW/UPDATE" column, in which "O" is described when data of the corresponding row have changed from those upon generation of an original document. The "NEW/UPDATE" column is expressed by fields 2204 and 2205 of the template data 2203. The field 2204 expresses a title "NEW/UPDATE" of the table, and the field 2205 expresses respective cells of the "NEW/UPDATE" column. Particularly, "<if condition="differ">O</if>" means that "O" is described when retrieved dataList data is different from content data upon generation of an original document.

A description of a field 2206 means that when data of the database is deleted, deleted dataList.name data is displayed. "<ul>" is a tag indicating a list, and "<li>" is a tag indicating an item of the list. A description bounded by "<li>" and "</li>" is expressed as an item of a list.

"<for listName="dataList" type="old">" means that content data associated with dataList data of an original document are sequentially retrieved.

"<if condition="differ" value="null">" means that when the retrieved content data of the original document is deleted from the database, a description within the tag is displayed. For example, when data of "id002" included in the data 1301 shown in FIG. 4 have been deleted in the data 1302, it is determined that data used upon generation of the original document have been deleted. In this case, after "deleted data: ", a value "Koyama" of "dataList.name" is displayed as a list.

FIG. 14 shows an example of a new document 2901 generated when this template set 2201 is used. The new document 2901 is an example of a new document generated based on the content data 1301 and 1302 shown in FIG. 4.

As can be seen from a comparison between the content data 1301 and 1302 shown in FIG. 4, in the content data upon generation of the new document, "tel" data of "id001" is updated from "0123" to "3210". Also, data of "id004" are newly added. In this case, the new document 2901 (FIG. 14) with "O" in cells of the "new/update" column corresponding to "id001" and "id004" is generated. Since there is no data deleted from the database, no name appears after "deleted data:".

Original document generation processing and new document generation processing will be described below. The original document generation processing will be described first. The first embodiment has explained the sequence of the processing for generating an original document using FIG. 5. In the third embodiment as well, an original document is generated by the same processing.

Unlike in the first embodiment, processing for storing retrieved content data or information required to retrieve content data is executed after the data retrieval processing in step S412. For this reason, data saving/data retrieval information saving processing is added after step S412. The added processing will be described below.

In the data saving/data retrieval information saving processing, data retrieved from the database in step S412 are saved in the hard disk 107 as a file. The data retrieved from the database are used to be merged with template data in merge processing in step S414, and are also used in the processing for generating a new document to check differences from content data upon generation of the new document. The data retrieved from the database are saved in the hard disk 107 in the data saving/data retrieval information saving processing. As a format upon saving these data in a file, the XML format, for example, is used.

In this case, as indicated by the content data 1301 in FIG. 4, three sets of data are expressed by a "dataList" tag which include, as child elements, "id", "name", "address", and "tel" elements having "id" information, "name" information, "address" information, and "tel" information as contents when three sets of information are retrieved as those of "name", "address", and "tel" of "dataList" data. This XML document is saved in a file as content data of an original document. Some databases have a mechanism which has a data update state as a log, and virtually restores to a database state at a certain date and returns data upon requesting data by designating that date. Upon retrieving data from such database, data retrieved from the database upon generation of an original document need not be saved in a file. When date information of execution of the retrieval processing is held together with the types of data to be retrieved from the database, and the retrieval condition, content data upon generation of an original document can be retrieved from the database at any time.

The content data used upon generation of an original document are stored in an identification information table in association with identification information as one document generation information used upon generation of a new document.

FIG. 15 shows an identification information table which associates information of content data used upon generation of an original document with identification information. An identification information table 1901 stores identification information, the storage location of a template set, and that of content data (content data information) or information required to retrieve content data in association with each other.

When content data retrieved from the database are stored as a file, a CPU 101 stores the storage location of content data as content data information. Upon retrieving data from a database which restores to a database state at that time upon designation of a date, and returns data, the CPU 101 stores the retrieval date of content data as content data information.

In the identification information table 1901 shown in FIG. 15, a storage location "file:///C:/doc/Contents1.xml" of an XML document that records content data themselves is stored in association with identification information "1234567890". Likewise, a storage location "http://host1/doc/Contents2.xml" of a XML data file that records content data themselves is stored in association with identification information "2345678901". Data retrieval date information "2005-10-06T21:05:02Z" designated upon retrieving content data from the database is stored in association with identification information "3456789012". "2005-10-06T21:05:02Z" represents a date "Oct. 6, 2005, 21:05:02".

The processing for saving information required to retrieve content data upon generation of an original document in the identification information table has been described.

The new document generation processing will be described below. The new document generation processing compares content data of an original document with data retrieved from the database upon generation of a new document, and generates a new document that specifies differences.

Since the rough sequence of the processing is the same as that of the flowchart of FIG. 8 described in the first embodiment, respective processes will be explained in accordance with the flowchart of FIG. 8. Since the same processes as in the first embodiment are executed until step S1103, the processing after detection of identification information will be explained.

In step S1104, a document generation information search unit 1005 reads out the identification information table saved in the hard disk 107, and acquires document generation information corresponding to the identification information passed from an identification information reading unit 1004.

A case will be taken as an example wherein identification information is "1234567890" and the identification information table 1901 in FIG. 15 is saved. In this case, the storage location "file:///C:/doc/template1.zip" and content data information "file:///C:/doc/Contents1.xml" are acquired as document generation information. The document generation information search unit 1005 passes the acquired document generation information to a document generation information acquisition unit 1006.

In step S1105, the document generation information acquisition unit 1006 accesses the storage location of the template set based on the information passed from the document generation information search unit 1005 to acquire a template set used in document generation. If template storage location information is "file:///C:/doc/template1.zip", the document generation information acquisition unit 1006 acquires a "template1.zip" file from the designated directory of the hard disk 107. As for the content data information, if the file storage location is "file:///C:/doc/Contents1.xml", the document generation information acquisition unit 1006 acquires a "Contents1.xml" file from the hard disk as the file storage location. If the content data information indicates a retrieval date of content data, the document generation information acquisition unit 1006 acquires that date information. The document generation information acquisition unit 1006 passes the acquired template set and content data "Contents1.xml" or date information to a document generation unit 1011.

In step S1106, the document generation unit 1011 instructs respective units to execute document generation processing using the document generation information passed from the document generation information acquisition unit 1006.

Upon receiving a file that stores content data of an original document, the document generation unit 1011 passes that file to a merge unit 1008. Upon receiving date information required to retrieve content data of an original document, the document generation unit 1011 passes the date information to a content data retrieval unit 1007.

Upon receiving the template set from the document generation information acquisition unit 1006, the document generation unit 1011 extracts data retrieval instruction information and template data used in document generation. The document generation unit 1011 passes the data retrieval instruction information to the content data retrieval unit 1007 to instruct it to retrieve content data. The content data retrieval unit 1007 passes the extracted template data to the merge unit 1008 to instruct it to merge the template data and content data.

For example, when the template set 2101 shown in FIG. 12 is designated, the document generation unit 1011 reads the property information 2102, and determines data to be passed to the merge unit 1008 and that to be passed to the content data retrieval unit 1007. The document generation unit 1011 passes template data "Template.xml" as the design information of a new document and "Difference.txt" as difference description information to the merge unit 1008. The document generation unit 1011 passes data retrieval instruction information "DataRetrieve.xml" to the content data retrieval unit 1007.

Likewise, when the template set 2201 shown in FIG. 13 is designated, the document generation unit 1011 passes template data "DiffTemplate.xml" of a new document to the merge unit 1008 based on the property information 2202. The document generation unit 1011 passes data retrieval instruction information "DataRetrieve.xml" to the content data retrieval unit 1007.

In step S1107, the content data retrieval unit 1007 retrieves content data used in generation of a new document. The content data retrieval unit 1007 retrieves content data from the database based on the data retrieval instruction information.

As in the content data retrieval method of the first embodiment, the content data retrieval unit 1007 reads the retrieval source, retrieval condition, and retrieved data contents from the data retrieval instruction information, and retrieves content data from the database in accordance with the information.

The content data retrieval unit 1007 saves the retrieved content data themselves in a file as information to be registered in the identification information table by an identification information appending unit 1009, or holds the retrieval date information. This is to hold information of content data of an original document in the identification information table when a new document is handled as the original document.

When the date information is given as information required to retrieve content data of the original document, the content data retrieval unit 1007 also retrieves content data of the original document from the database. The content data retrieval unit 1007 retrieves content data upon generation of the original document from the database by designating the date information together with the retrieval source, retrieval condition, and retrieved data contents of the data retrieval condition.

The content data retrieval unit 1007 passes the retrieved current content data, and the content data upon generation of the original document to the merge unit 1008.

In step S1108, the merge unit 1008 generates a document by merging the content data with the template data. In this case, the merge unit 1008 detects difference from the content data of the original document, and executes document generation processing in accordance with a format upon detection of the differences. Detailed processing will be described later. The merge unit 1008 passes the generated document data to the identification information appending unit 1009.

In step S1109, the identification information appending unit 1009 executes processing for appending identification information to the passed document. The identification information appending unit 1009 generates new identification information, and registers the identification information and document generation information used to generate the new document in the identification information table in association with each other. The document generation information registered in association with the identification information includes the storage location of the template set used, and the content data held by the content data retrieval unit 1007 or the retrieval date information of the content data from the database. The registered content data are handled as those of an original document when this identification information is scanned next time.

The identification information appending unit 1009 converts the identification information into a QR code, and appends the QR code to the document. The identification information appending unit 1009 passes the document appended with the identification information to a format conversion unit 1010.

Since format conversion processing (step S1110) of the format conversion unit 1010 and output processing (step S1111) of a print unit 1012 are the same as those in the first embodiment, a repetitive description thereof will be avoided.

The processing for generating a document which displays differences between content data of an original document and current content data will be described below. This processing is executed by the merge unit 1008. In the third embodiment, the merge unit 1008 executes processing for detecting content data differences, and reflecting the differences of design on a document. The processing of the merge unit 1008 when the template set 2101 shown in FIG. 12 is designated will be described in detail below.

When the template set 2101 in FIG. 12 is designated, the document generation unit 1011 passes the template data "Template.xml" 1201 and difference description information "Difference.txt" 2103 to the merge unit 1008. The merge unit 1008 reads the "Template.xml" 1201, and generates a document in accordance with the read tags.

The processing upon reading a "<for>" tag and tags such as "<table>", "<td>", "<tr>", and the like that represent design information is the same as the first embodiment. Processing upon reading "<data>" will be described below.

Figure 16:
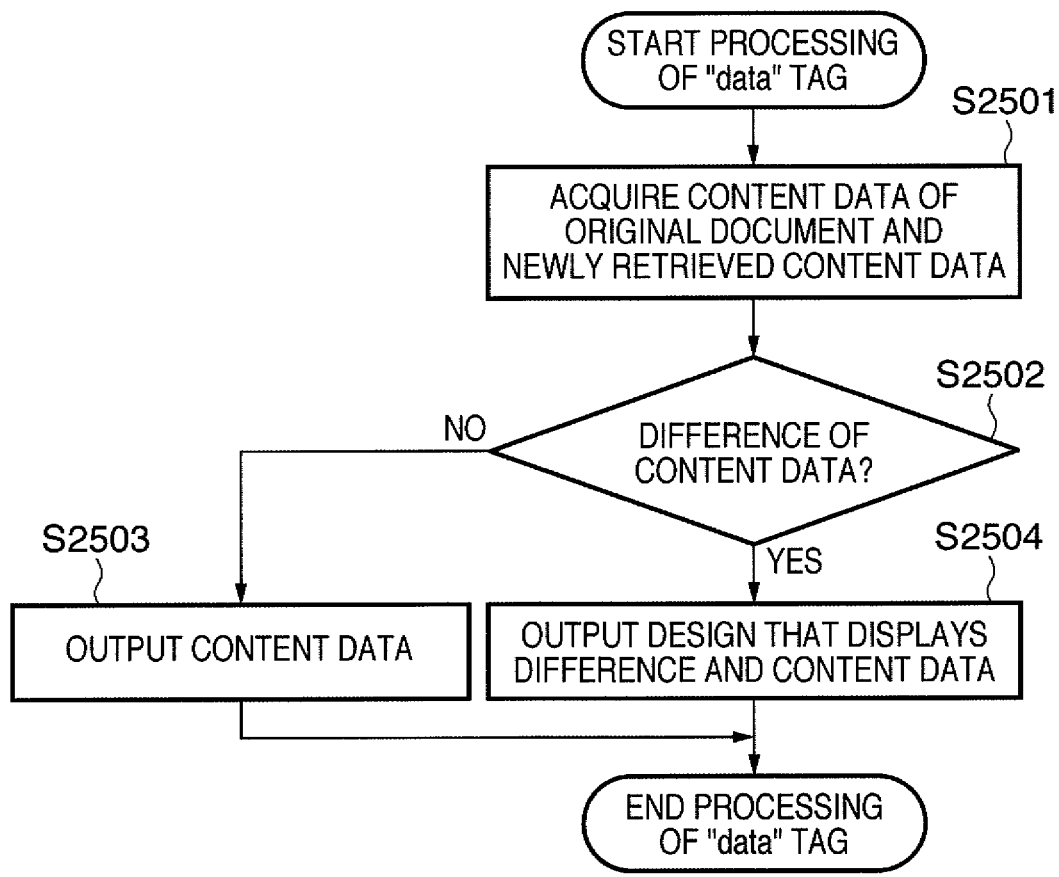
FIG. 16 is a flowchart showing the sequence of processing upon detection of a "<data>" tag.

FIG. 16 is a flowchart showing the sequence of processing upon detection of a "<data>" tag. Upon detection of the "<data>" tag, the merge unit 1008 reads the content data of the original document acquired from the content data retrieval unit 1007 and the newly retrieved content data (step S2501). The merge unit 1008 checks if the read data have differences (step S2502). If the read data do not have any difference, the merge unit 1008 outputs the content data intact (step S2503). If it is determined in step S2502 that the read data have differences, the merge unit 1008 outputs design information designated by the difference description information "Difference.txt" and the content data (step S2504).

A practical explanation will be given using the content data 1301 of the original document and newly retrieved content data 1302, both shown in FIG. 4.

Upon reading "<data name="dataList.name"/>" of the "Template.xml" 1201, the merge unit 1008 reads out a "dataList.id" value from the newly retrieved content data. The merge unit 1008 then confirms if the content data 1301 of the original document include data having the same "id".

If the content data 1301 of the original document include data having the same "id", the merge unit 1008 compares dataList.name values of the same "id". If the dataList.name values are equal to each other, the merge unit 1008 outputs the dataList.name value intact. Since the dataList.name values of "id=id001" have no difference, the dataList.name value is output intact.

Like dataList.tel values of "id=id001", since original content data "0123" is different from new content data "3210", the merge unit 1008 outputs the new dataList.tel value "3210" in a description designated by the difference description information "Difference.txt" 2103.

The "Difference.txt" 2103 designates to display new content data different from that of the original document using a description "Arial font, bold & italic face, and red". The merge unit 1008 outputs design information to express a character string using the description "Arial font, bold & italic face, and red" in accordance with that designation. For example, in an HTML expression, the design information can be expressed by "<font face="Arial" color="red"><strong><i></i></strong></font>". The merge unit 1008 outputs different data together with the design information. Therefore, dataList.tel information "3210" of "id="id001"" is output as "<font face="Arial" color="red"><strong><i>3210</i></strong></font>".

Like data of "dataList.id=id004", when the content data of the original document do not include such data, the merge unit 1008 determines that content data have differences. In this case, a dataList.name value "Watanabe", dataList.address value "Tokyo", and dataList.tel value "4567" are output to be bounded by tags required to output them using the description "Arial, bold & italic face, and red". As a result, the document to be generated is output so that "3210" (dataList.tel of "id=id001"), and "Watanabe", "Tokyo", and "4567" ("id=id004") have a description according to design information "Arial, bold & italic face, and red" specified by the difference description information.

The processing of the merge unit 1008 when the template set 2201 in FIG. 13 is designated will be described in detail below.

The template set 2101 designates to generate a new document using the template data "Template.xml" 1201 and the difference description information "Difference.txt" 2103 that defines the difference data description method. The template set 2201 defines the template data "DiffTemplate.xml" 2203 used to generate a new document independently of the template data "Template.xml" 1201 used to generate the original document. The template data "DiffTemplate.xml" 2203 describes a design description method when content data of the original document and that of a new document have a difference. The merge unit 1008 expresses differences of data according to this description.

The merge unit 1008 reads the template data "DiffTemplate.xml" 2203 and executes merge processing. The processing executed upon appearance of a "<for>" tag and normal tags is the same as the first embodiment.

The processing executed upon appearance of an "<if>" tag will be described below.

Upon detection of an "<if>" tag, the merge unit 1008 acquires content data of the original document and newly retrieved content data for data designated by a "listName" attribute of the immediately preceding "<for>" tag.

The merge unit 1008 reads a "condition" attribute of the "<if>" tag, and checks a condition. "condition="differ"" is contingent on that content data of the original document and newly retrieved content data have a difference. The merge unit 1008 compares content data values. If the condition is met, the merge unit 1008 executes processing up to an "if" end tag "</if>". If the condition is not met, the merge unit 1008 skips up to the "if" end tag "</if>" without any processing.

A description "<if condition="differ" data="dataList">" in the field 2205 of FIG. 13 has the following meaning. That is, if new content data is different from the original data in association with a "dataList" value designated by the "listName" attribute of the immediately preceding "<for>" tag, processing within the "<if>" tag is executed. Content data are compared to detect if new content data is different from that of the original document in terms of any of dataList.name, dataList.address, and dataList.tel values. When the content data 1301 of the original document and new content data 1302 are used, the following processing is executed. That is, differences are detected for the dataList.tel value of id="id001", which has been updated, and newly added data of id="id004", and processing after <if> is executed. In this case, the processing after <if> is to output "◯". Hence, "◯" is displayed in cells of the "NEW/UPDATE" column of data corresponding to "id=id001" and "id=id004", as shown in the output result 2901 of FIG. 14.

The processing of an <if> tag "<if condition="differ" value="null">" in a description of the field 2206 in FIG. 13 will be described below.

In this <if> tag as well, a difference is detected for content data designated by the immediately preceding <for> tag. "<for listName="dataList" type="old">" means execution of a "for" statement based on old dataList data, that is, content data of the original document. That is, this means that the processing within the <for> tag is repeated as many as the total number of dataList data of the original document. In the immediately preceding <if> statement, data comparison is made based on content data of the original document defined as a basis by the <for> tag.

"<if condition="differ" value="null">" indicates that when new content data do not include content data of the original document, processing after "if" is executed. "value="null"" means the absence of data to be compared.

Assume that the content data 1301 of the original document and the new content data 1302 in FIG. 4 are used. In this case, this means that the "id" values of the content data of the original document match any of the new content data, and there is no deleted content data. That is, no data that meets the condition exists, and the processing in the <if> tag is skipped.

However, if content data included in the original document are deleted upon generation of a new document, this condition is met, and the processing within the <if> tag is executed, thus outputting a dataList.name value.

In the field 2206 in FIG. 13, "<ul>" is a tag indicating the start of a list. Also, "<li>" is a tag that represents an item of the list. If content data have differences, the generated document displays the deleted dataList.name value as a list after "deleted data:".

With the aforementioned sequence, a new document that describes differences (new, update, delete) from the content data of the original document is generated.

A generation example of a new document which expresses differences of numerical value data as those between content data upon generation of the original document and those upon generation of a new document will be described below. The following description will be given taking, as an example, an original document and database data different from those used in the above description. However, since the processing except for that of the merge unit 1008 is the same as that described above, the processing of the merge unit 1008 will be described.

Reference numeral 2501 in FIG. 17 denotes an original document which expresses a monthly sales table. This document shows divisions and sales amounts in these divisions.

Reference numeral 2502 in FIG. 17 denotes an example of a new document generated based on the original document 2501. This document shows the divisions, the latest monthly sales amounts in these divisions, and differences from the sales amounts described in the original document.

FIG. 18 shows data of a database used to generate a document. Reference numeral 2701 denotes content data used to generate the original document 2501 in FIG. 17; and 2702, content data to be used to generate the new document 2502 in FIG. 17. A data list "dataListSales" holds data corresponding to "division" items indicating the division names and "sales" items indicating the sales amounts in association with each other. "Id101", "Id102", "Id103", and "Id104" respectively hold the monthly sales amounts of division names "A", "B", "C", and "D". The content data 2701 and 2702 have different "sales" values, and indicate that the monthly sales amounts upon generation of the original document are different from those upon generation of the new document in the respective divisions.

FIG. 19 shows an example of template data used upon generation of a new document. This template data corresponds to "DiffTemplate.xml" in the aforementioned example. The template data is used to generate a document including table data having a title line "MONTHLY SALES TABLE", table item names "DIVISION", "SALES (TEN-THOUSANDS YEN)", and "DIFFERENCE (TEN-THOUSANDS YEN)", data retrieved from the database, and values obtained by making calculations using the retrieved data. When the content data 2701 upon generation of the original document and the content data 2702 upon generation of the new document are used for template data 2801, the new document 2502 in FIG. 17 is output. The processing executed when the merge unit 1008 generates a document merged using the template data 2801 and the content data 2701 and 2702 will be described below.

The processing for holding the content data of the original document and that executed upon reading the "<for>" tag and the tags such as "<table>", "<td>", "<tr>", and the like that represent design information are the same as those described above. The processing executed when the merge unit 1008 reads "<if>" and "<subtract>" will be described below.

"<if condition="differ" data="dataListSales.sales">" means execution of processing of a child element when the "sales" value of the retrieved data list "dataListSales" is different from that of the data list "dataListSales" upon generation of the original document. Upon comparing the "sales" values of the identical "Id" values of the content data 2701 upon generation of the original document and the content data 2702 upon generation of the new document, the "sales" values are different for all of "Id101", "Id102", "Id103", and "Id104". Therefore, in four data comparisons, the merge unit 1008 executes processing of a child element "<subtract data="dataListSales.sales"/>" of "<if condition="differ" data="dataListSales.sales">".

"<subtract data="dataListSales.sales"/>" means that a value obtained by subtracting content data upon generation of the original document from that upon generation of the new document in association with a value designated by a "data" attribute is merged. In this case, a subtraction is executed for the "sales" values of the data lists "dataListSales" designated by the "data" attribute "dataListSales.sales". For example, since the "sales" value of the content data 2701 for "Id101" is "1500" and that of the content data 2702 is "1575", "+75" is output as a result of the subtraction. Likewise, every time the processing of the child element is repeated in turn according to "<for listName="dataListSales"/>", "−100" for data of "Id102", "+50" for data of "Id103", and "+250" for data of "Id104" are output.

FIG. 20 shows a document output when the merge unit 1008 completes the merge processing of the template data 2801. A document 2901 expresses the "division" value, "sales" value upon generation of the new document, and the "sales" value obtained by calculating a difference from the value upon generation of the original document in one row for each of the four data of the data list "dataListSales".

With the aforementioned sequence, a new document which describes differences of numerical value data of content data is generated.

A method of specifying differences from the original document on a new document has been described.

The third embodiment has described the example in which a description of a new document is changed from that of the original document upon detection of differences. However, by finely expressing the condition settings of the <if> tag used in the template "DiffTemplate.xml" used in generation of a new document, differences between the original document and new document can be flexibly set. For example, the differences of numerical values are compared. If a difference assumes a minus value, it is described using red characters; if a difference assumes a plus value, it is described using black characters, thus explicitly expressing plus and minus variation states of numerical value data. Depending on the magnitudes of the differences of numerical values, different colors may be used.

In the third embodiment, the MFP compares content data. However, in some databases, data at the designated date are compared with current data, and changed or deleted data can be acquired. Upon retrieving content data from such database, since the database executes the processing for detecting differences, the differences of content data may be acquired by designating the date information upon generation of the original document.

According to the aforementioned embodiments, when the user wants to generate a document including the latest data on the database based on a target original document, a desired new document can be generated by scanning identification information of the original document. In this manner, the user can easily generate a new document without recognizing template data and data retrieval instruction information required to generate the new document.

When template data different from that used to generate the original document is associated with identification information so as to generate a new document, a document with a format different from the original document can be generated.

Upon generation of a new document, content data of the original document and current document data of the database are compared. Different content data are displayed in a layout different from that of other content data. In this manner, a document that specifies differences from the original document can be generated.

Furthermore, identification information that designates the storage location of a template set is appended to a normal document which is generated without using any template set, and a new document can be generated using that document as an original document. Therefore, identification information of a document appended with the identification information is scanned, and a document having a quite different appearance can be obtained as an output result.

The objects of the present invention are also achieved by supplying a storage medium, which records a program code of software that can implement the functions of the above-mentioned embodiments to a system or apparatus, and reading out and executing the program code stored in the storage medium by a computer of the system or the like.

In this case, the program code itself read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The scope of the present invention also includes a case wherein the functions of the above-mentioned embodiments are implemented by some or all actual processes executed by an OS or the like, which runs on the computer, based on the instruction of the program code read out by the computer.

Likewise, the scope of the present invention includes a case wherein the functions of the above-mentioned embodiments are implemented when the program code read out from the storage medium is written in a memory equipped on a function expansion unit connected to the computer, and a CPU or the like executes actual processes based on the instruction of that program code.

Furthermore, the scope of the present invention includes an arrangement that supplies the program code to the computer via a communication medium such as the Internet or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-123786, filed May 8, 2007, which is hereby incorporated by reference herein in its entirety.

What is claimed is:

1. A document generation apparatus comprising:
a document information memory configured to store respective layout data and respective sources of latest contents for a plurality of documents in correspondence with respective identification information;
a program memory configured to store a program; and
a processor configured to execute the program stored in the program memory, the processor configured to provide:
a reading unit configured to scan at least part of a first document in which an original content of the first document is laid out in a layout according to first layout data and to read out first identification information from the scanned first document;
a first acquisition unit configured to acquire, based on the first identification information read out from the first document, the first layout data and a first source of a latest content of the first document from the document information memory;
a second acquisition unit configured to acquire the latest content of the first document from the first source of the latest content of the first document acquired by said first acquisition unit;
a generation unit configured to generate a second document by laying out the latest content of the first document acquired by said second acquisition unit in accordance with the first layout data acquired by said first acquisition unit; and
a printing unit configured to print out the second document generated by the generation unit as a latest version of the first document in which the latest content of the first document is laid out in the same layout as the original content of the first document.

2. The apparatus according to claim 1, wherein the printing unit prints out the second document with appending the first identification information.

3. The apparatus according to claim 1, wherein the document information memory comprises a template memory and a table, the template memory stores respective layout data and respective sources of latest contents for the plurality of documents, and the table stores addresses of information for the plurality of documents in the template memory in correspondence with respective identification information.

4. The apparatus according to claim 1, wherein the reading unit reads out the first identification information by decoding an identification code in the scanned first document to the first identification information.

5. A document generation method comprising:
scanning at least part of a first document in which an original content of the first document is laid out in a layout according to first layout data;

reading out first identification information from the scanned first document;

acquiring, based on the first identification information read out from the first document, the first layout data and a first source of a latest content of the first document from a document information memory which stores respective layout data and respective sources of latest contents for a plurality of documents in correspondence with respective identification information;

acquiring the latest content of the first document from the acquired first source of the latest content of the first document;

generating a second document by laying out the latest content of the first document acquired from the first source in accordance with the first layout data acquired from the document information memory; and printing out the generated second document as a latest version of the first document in which the latest content of the first document is laid out in the same layout as the original content of the first document.

6. A non-transitory storage medium storing a computer program for generating a document, the computer program comprising:

scanning at least part of a first document in which an original content of the first document is laid out in a layout according to first layout data;

reading out first identification information from the scanned first document;

acquiring, based on the first identification information read out from the first document, the first layout data and a first source of a latest content of the first document from a document information memory which stores respective layout data and respective sources of latest contents for a plurality of documents in correspondence with respective identification information;

acquiring the latest content of the first document from the acquired first source of the latest content of the first document;

generating a second document by laying out the latest content of the first document acquired from the first source in accordance with the first layout data acquired from the document information memory; and printing out the generated second document as a latest version of the first document in which the latest content of the first document is laid out in the same layout as the original content of the first document.

* * * * *